US009573281B2

(12) United States Patent
Takahashi et al.

(10) Patent No.: US 9,573,281 B2
(45) Date of Patent: Feb. 21, 2017

(54) INDUSTRIAL ROBOT PROVIDED WITH HORIZONTAL MULTISTAGE TELESCOPIC DEVICE

(71) Applicant: DENSO WAVE INCORPORATED, Chita-gun, Aichi-pref. (JP)

(72) Inventors: Yoshinori Takahashi, Kariya (JP); Takayuki Saito, Chita (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 95 days.

(21) Appl. No.: 14/315,487

(22) Filed: Jun. 26, 2014

(65) Prior Publication Data
US 2015/0003945 A1 Jan. 1, 2015

(30) Foreign Application Priority Data

Jun. 27, 2013 (JP) .................................. 2013-134896
Mar. 27, 2014 (JP) .................................. 2014-066014

(51) Int. Cl.
*B25J 18/02* (2006.01)
*B25J 9/10* (2006.01)
*B25J 9/02* (2006.01)

(52) U.S. Cl.
CPC ............... *B25J 18/025* (2013.01); *B25J 9/023* (2013.01); *B25J 9/104* (2013.01); *B25J 18/02* (2013.01)

(58) Field of Classification Search
CPC ............. B25J 18/02; B25J 9/023; B25J 9/104
See application file for complete search history.

(56) References Cited

U.S. PATENT DOCUMENTS

| 3,010,328 | A | | 11/1961 | Forey |
| 4,842,476 | A | | 6/1989 | Shiotani |
| 5,467,685 | A | | 11/1995 | Hubl |
| 5,611,248 | A | * | 3/1997 | Peltier ..................... B25J 9/023 414/749.1 |

(Continued)

FOREIGN PATENT DOCUMENTS

| DE | 38 44 238 C2 | 11/1990 |
| DE | 92 12 754 U1 | 12/1992 |

(Continued)

OTHER PUBLICATIONS

Mar. 5, 2015 Office Action issued in German Application No. 10 2014 108 982.0.

*Primary Examiner* — Gerald McClain
(74) *Attorney, Agent, or Firm* — Oliff PLC

(57) ABSTRACT

An industrial robot is provided with a horizontal multistage telescopic device. In the device, a slider is mounted to s base so as to be movable in a first direction and in a second direction which are opposite to each other along the horizontal direction. An output arm has an end in the second direction, the end being provided with an output arm support, and is expanded in the first direction from the output arm support. The output arm support is mounted to a slider so as to be horizontally movable in the first and second directions. The output arm has an end in the first direction, to which an end effector is mounted. A motor is mounted to an end of the slider in the second direction. A rotation transmitting member transmits torque of the motor to a second rotor of a movement mechanism.

14 Claims, 29 Drawing Sheets

(a)

(b)

(c)

(56) References Cited

U.S. PATENT DOCUMENTS

| | | | |
|---|---|---|---|
| 5,716,187 A * | 2/1998 | Costa | B25J 9/023 |
| | | | 414/751.1 |
| 7,385,386 B2 | 6/2008 | Amemiya et al. | |
| 2009/0084749 A1* | 4/2009 | Massmann | B65G 47/911 |
| | | | 212/312 |

FOREIGN PATENT DOCUMENTS

| | | |
|---|---|---|
| DE | 9214125 U1 | 12/1992 |
| DE | 43 34 681 C2 | 9/1995 |
| DE | 196 13 901 A1 | 10/1997 |
| DE | 10 2010 022 625 A1 | 12/2011 |
| JP | A-09-028589 | 2/1997 |
| JP | A-11-245189 | 9/1999 |
| JP | 2011-173208 A * | 9/2011 |
| WO | 2007/082748 A1 | 7/2007 |

* cited by examiner

RELATED ART

INDUSTRIAL ROBOT PROVIDED WITH HORIZONTAL MULTISTAGE TELESCOPIC DEVICE

CROSS-REFERENCE TO RELATED APPLICATION

This application is based on and claims the benefit of priority from earlier Japanese Patent Applications No, 2013-134896 filed Jun. 27, 2013 and No. 2014-066014 filed Mar. 27, 2014, the description of which are incorporated herein by reference.

BACKGROUND OF THE INVENTION

Technical Field

The present invention relates to an industrial robot provided with a horizontal multistage telescopic device.

Related Art

Industrial robots are equipped, as required, with a multistage telescopic device that needs only a small installation space relative to an aimed length of stroke (e.g., see JP-A-H09-028589 and JP-A-H11-245189). As such a multistage telescopic device, a horizontal multistage telescopic device has a basic configuration as roughly illustrated in FIG. 8. A part (a) of FIG. 8 illustrates a horizontal multistage telescopic device 100 that is in a state where a slider 102 and an output arm 104, which will be described later, are at their home positions (movement limitation positions relative to a direction indicated by an arrow X2). A part (b) of FIG. 8B illustrates the horizontal multistage telescopic device 100 that is in a state where the output arm 104 has been expanded to an aimed position of stroke.

As shown in the parts (a) and (b) of FIG. 8, the horizontal multistage telescopic device 100 has a base 101 which is arranged such that the slider 102 is movable in a direction of an arrow X1 (horizontally rightward in the parts (a) and (b) of FIG. 8) and in an opposite direction of the arrow X2. The slider 102 includes a movable block 103 which is made movable in the directions of the arrows X1 and X2 as well.

The output arm 104 has a left end portion which is mounted to the movable block 103. In other words, the output arm 104 is projected from the movable block 103 in the direction of the arrow X1. Although not shown in FIG. 8, the output arm 104 has a tip to which an end effector, such as a hand or a drill, is attached.

Further, the slider 102 includes a movement mechanism 105. The movement mechanism 105 is configured by pulleys 105a and 105b, as well as a belt 105c. The pulleys 105a and 105b are rotatably provided at both horizontal ends of the slider 102. The belt 105c is provided across the pulleys 105a and 105b and has two sides facing with each other. Of the two sides facing with each other in the belt 105c, one side has a portion 105h connected to the base 101, while the other side has a portion 105i, as a portion extremely opposite to the portion 105h, connected to the movable block 103.

The horizontal multistage telescopic device 100 includes a drive mechanism 110 which includes a motor 111, a rotation transmission mechanism 112 and a ball screw device 113. The motor 111 is mounted to the base 101 via a mounting end plate 101a. The ball screw device 113 includes a ball screw 113a and a nut case 113b. The nut case 113b has an interior in which a nut that threadably engages with the ball screw 113a is rotatably arranged. The ball screw 113a has an end which is fixed to the slider 102 via a mounting end plate 102a, while the nut case 113b is fixed to the base 101 via the mounting end plate 101a.

The rotation transmission mechanism 112 plays a role of transmitting rotation of the motor 111 to the nut, and includes a pulley 112a mounted to the rotary shaft of the motor 111, a pulley 112b mounted to the nut and a belt 112c provided across these pulleys.

When the motor 111 of the drive mechanism 110 is rotated in a given direction, the nut is rotated in a given direction via the rotation transmission mechanism 112. Since the nut case 113b having the nut does not move, the ball screw 113a is pushed toward the direction of the arrow X1 by the rotation of the nut, permitting the slider 102 to move in the direction of the arrow X1. Thus, as mentioned above, the output arm 104 is permitted to move by a distance corresponding to an aimed stroke St (see the part (b) of FIG. 8).

Parts (a) and (b) of FIG. 9 illustrate an exemplification, or an actual configuration, of the horizontal multistage telescopic device illustrated in FIG. 8. The functional components identical with or similar to those shown in FIG. 8 are given the same reference numerals.

For example, as shown in a part (a) of FIG. 10, the horizontal multistate telescopic device 100 is assembled to a carrier device 200 and an elevator device 300 to configure an industrial robot. In this case, the base 101 is mounted to an elevator member 301 of the elevator device 300 which is incorporated into the carrier device 200. The carrier device 200 moves (carries) the elevator device 300 in a direction indicated by an arrow A1 (forward) and in an opposite direction indicated by an arrow A2. The elevator device 300 moves (lifts up and down) the horizontal multistage telescopic device 100 in a direction indicated by an arrow B1 (upward) and in an opposite direction indicated by an arrow B2. An end effector E, such as a hand or a drill, is mounted to a tip of the output arm 104 of the horizontal multistage telescopic device 100.

In a state shown in the part (a) of FIG. 10, the output arm 104 of the horizontal multistage telescopic device 100 is at a home position. From this state, the output arm 104 is moved in the direction of the arrow X1 so that the end effector E of the output arm 104 can reach a target coordinate M (see a part (c) of FIG. 10) residing in the direction of the arrow X1. A part (b) of FIG. 10 shows a state where the output arm 104 is in the midst of being moved. After that, the horizontal multistage telescopic device 100 is lifted down to a target position in the vertical direction by the elevator device 300. Then, the end effector carries out its work, such as gripping a work or releasing the grip, or drilling a work.

The horizontal multistage telescopic device 100 installed in industrial robots is used for assembling precision devices or performing precision machining. Therefore, the horizontal multistage telescopic device 100 is required to provide highly accurate performance, or have high movement speed as a robot from the viewpoint of productivity.

However, in the horizontal multistate telescopic device 100 based on conventional art, when the output arm 104 has been moved to the target coordinate M, the tip of the output arm 104 can finely vibrates up and down (i.e., residual vibration). For this reason, positioning at the target coordinate M is difficult, which leads to impairing assembling or working accuracy. A measure against this problem may be to wait until the convergence of the residual vibration. However, such a measure leads to lowering of the movement speed of the robot and lowering of productivity.

SUMMARY

Hence, it is desired to provide an industrial robot which is able to minimize the residual vibration that occurs when the output arm of a horizontal multistage telescopic device is moved to a target coordinate.

The inventors investigated the factor of the residual vibration. The investigation revealed the following matters. Firstly, the inventors successively changed the stroke of movement (length of projection from the base 101) of the output arm 104 and measured the vibration in the tip of the output arm 104. It was revealed that longer length of projection caused larger residual vibration. As a result of further discussion on this, the factor of the residual vibration is estimated to be the moment of load in the output arm 104 when the base 101 is used as an end for fixation.

Studying the moment of load, the elements associated with the moment of load in a state where the output arm 104 is expanded are the slider 102, the movable block 103 and the movement mechanism 105. These elements are essential because they are used for expanding and contracting the output arm 104. Except for these elements, the elements that can influence the moment of load are the ball screw 113a provided to the slider 102 and having a length substantially covering the entire length of the slider 102, and the mounting end plate 102a that supports the ball screw 113a. These elements, as weight load, were revealed to work on the slider 102 and to be the factor of increasing the moment of load in expanding the output arm.

The reason why the ball screw device 113 is used in the configuration based on conventional art is as follows. In a concept, the motor 111 as a drive source is fixed to the base 101 that is a support base for individual members in the horizontal multistage telescopic device 100. This concept is based on that, in order to convert the rotation of the motor 111 into a linear motion for directly moving (transferring) the slider 102 by a distance corresponding to a required stroke, the ball screw 113a is required to be used, which has a length of directly imparting the required stroke to the slider 102. This concept makes it necessary, as mentioned above, to use the ball screw 113a having a length that enables the slider 102 to move by a distance corresponding to a predetermined stroke, and the mounting end plate 102a for supporting the ball screw, leading to the increase of moment of load.

Therefore, the inventors sought for a scheme of moving a slider, alternative to the scheme of permitting the ball screw device 113 to directly push and pull the slider 102 for the movement thereof. The inventors focused on an alternative scheme that could move (self-propel) the slider 102 by rotating the pulley 105b located at an end of the slider 102 in a direction of the arrow X2 (refer to FIG. 8).

In this case, the pulley 105b is required to be rotated by a motor. A configuration that can transmit the rotation of the motor to the pulley 105b may be a rotation transmission mechanism, such as a belt transmission mechanism or a gear transmission mechanism. However, when the motor is fixed to a base according to the conventional concept in a rotation transmission mechanism, the pulley 105b unavoidably moves with the slider 102. This varies the direction between the motor and the pulley 105b, disabling use of the rotation transmission mechanism in which a rotation transmission distance is invariant, and thus disabling rotation transmission from the motor to the pulley 105b.

One aspect of the present disclosure is provided taking account of the circumstances set forth above.

Practically an industrial robot includes a motor mounted to a slider, not to a base, and includes a rotation transmitting member also mounted to the slider. The rotation transmitting member transmits the rotation of the motor to a second rotor to rotate the second rotor. With the provision of the motor to the slider, the distance between the motor and the second rotor becomes invariant in the slider, enabling use of the rotation transmitting member. Accordingly, the slider can be moved without using the conventional ball screw device. Elimination of the conventional ball screw device leads to reducing the weight corresponding to a ball screw and a mounting end plate, thereby reducing the moment of load. In this structure, there is a concern that the provision of the rotation transmitting member increases weight accordingly. However, since the conventional ball screw device originally includes a rotation transmitting member as well, the rotation transmitting member does not newly increase a weight.

The motor and the rotation transmitting member are provided to an end of the slider in the second direction. Accordingly, when an output arm of a horizontal multistage telescopic device is expanded with a maximum stroke, the motor and the rotation transmitting member are located on an opposite side of the output arm relative to the base. Therefore, the motor and the rotation transmitting member do not act as new moment of load on the output arm. Thus, the residual vibration is reduced when the output arm of the horizontal multistage telescopic device has been moved to a target coordinate.

As described above, the reduction of moment of load can reduce the load imposed on individual parts of the horizontal multistage telescopic device, thereby elongating the life as an industrial robot. Further, the elimination of the ball screw device leads to reducing the number of parts.

DETAILED DESCRIPTION OF THE PREFERRED EMBODIMENTS

With reference to the accompanying drawings, hereinafter are described several embodiments of the present invention.

First Embodiment

Figure 1:
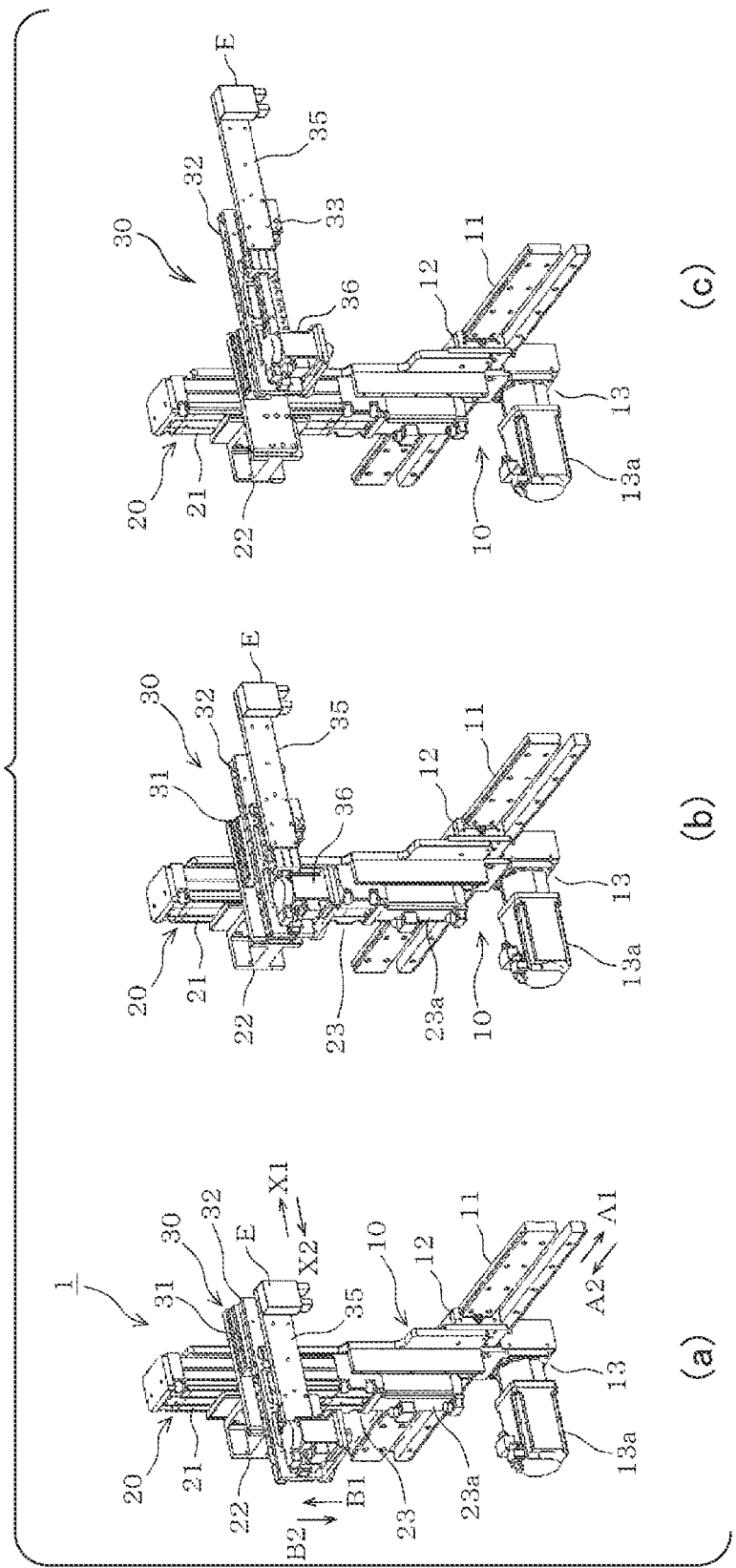
FIG. 1 shows perspective views illustrating an industrial robot in a state where an output arm of a horizontal multistage telescopic device is at a home position, in the midst of being moved, and has reached a target coordinate, respectively, according to a first embodiment of the present invention.

Referring first to FIGS. 1 to 7, a first embodiment of the invention is described. FIG. 1 illustrates an industrial robot 1 of the first embodiment. As shown in these figures, the industrial robot 1 includes a carrier device 10, an elevator device 20 and a horizontal multistage telescopic device 30. The carrier device 10 includes a carrier rail 11 as a carrier track, a carrier member 12 movably mounted to the carrier rail 11, and a carrier drive mechanism 13 having a motor 13a to move the carrier member 12 in a direction indicated by an arrow A1 and in a direction opposite thereto indicated by an arrow A2.

The elevator device 20 includes an elevator body 21, an elevator member 22 and an elevator drive mechanism 23. The elevator member 22 is mounted to the elevator body 21 so as to be movable in a direction indicated by an arrow B1 (upward) and in a direction indicated by an arrow B2 (downward). The elevator drive mechanism 23 has a motor 23a to move the elevator member 22 in the directions of the arrows B1 and B2. The elevator body 21 is mounted to the carrier member 12 of the carrier device 10.

Figure 2:
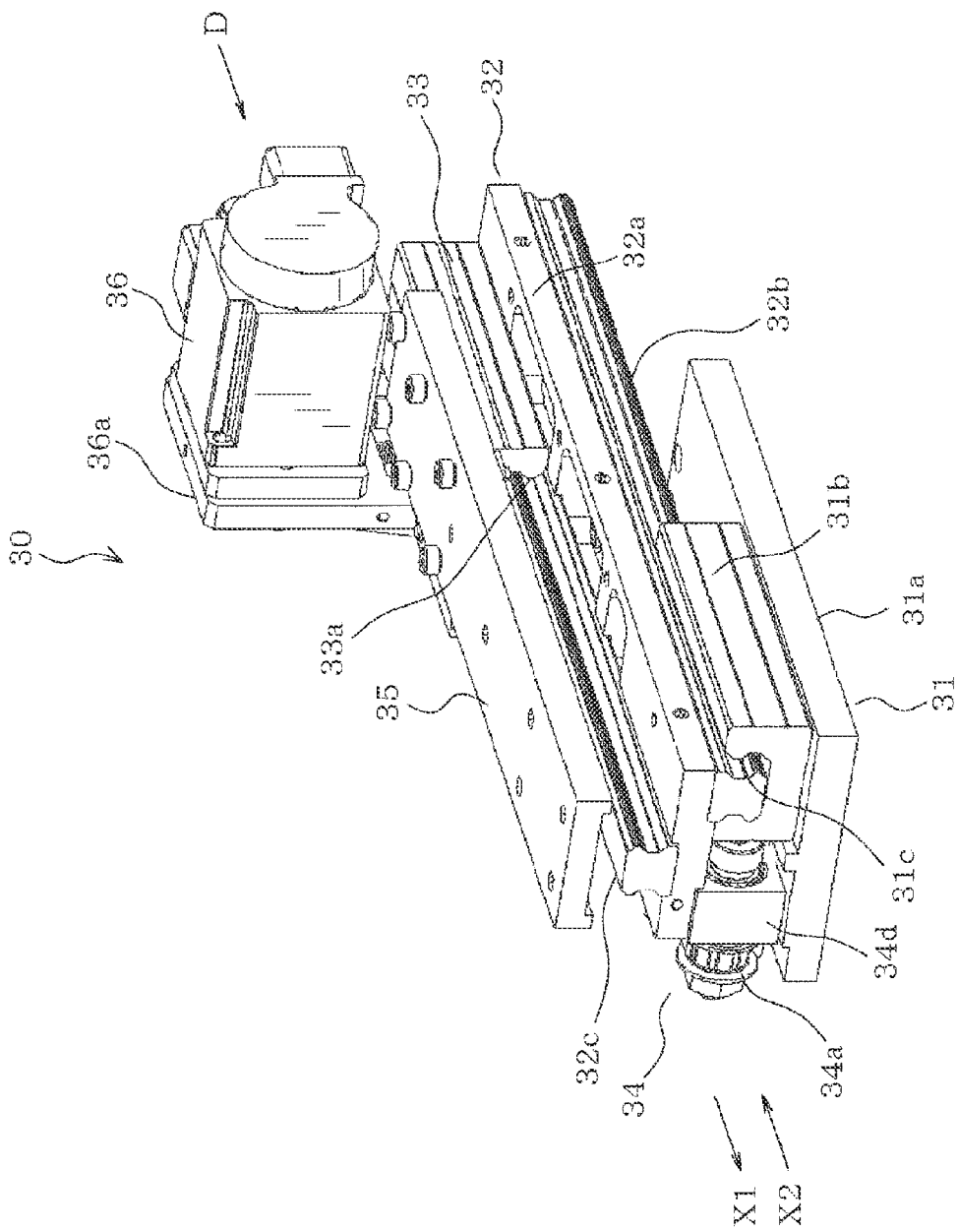
FIG. 2 is a perspective view illustrating the horizontal multistage telescopic device in a state of being located at the home position.
Figure 3:
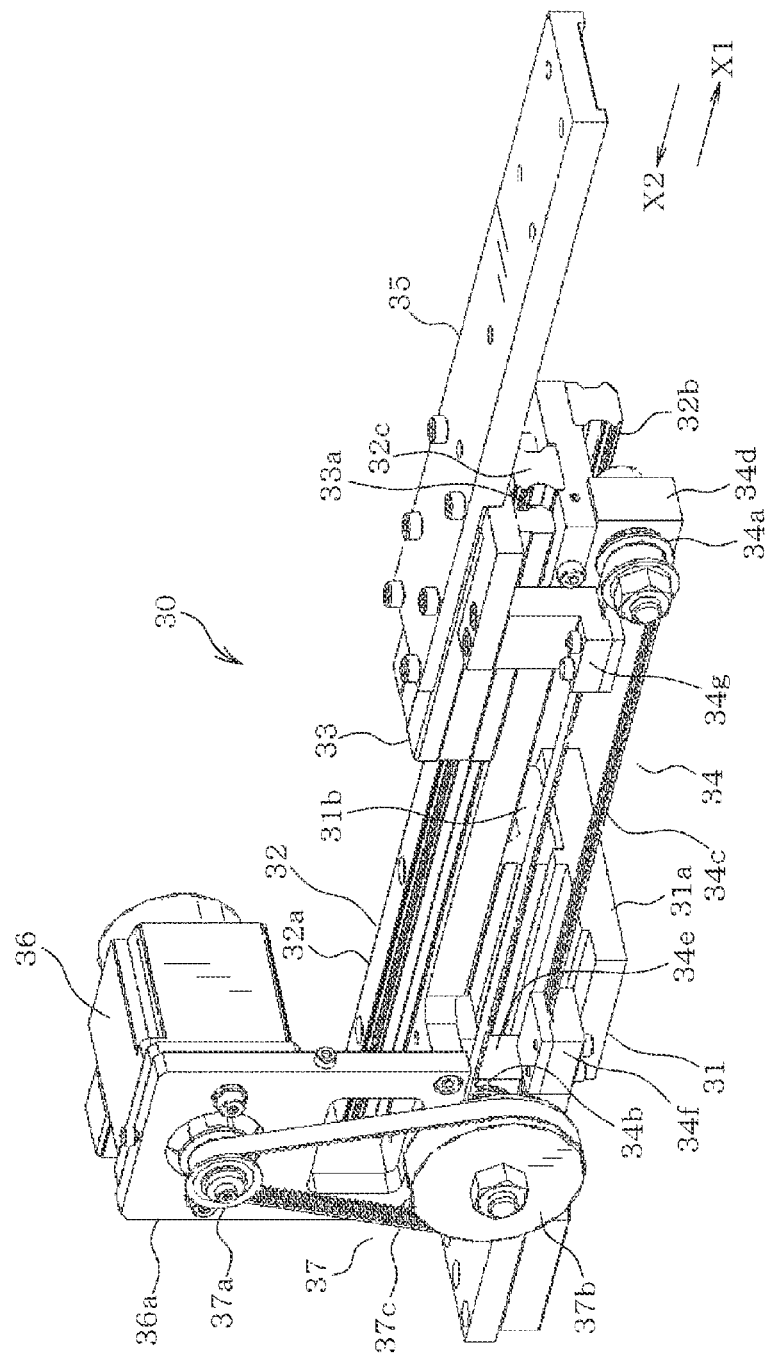
FIG. 3 is a perspective view illustrating the output arm in a state of having been moved to a target coordinate.
Figure 4:
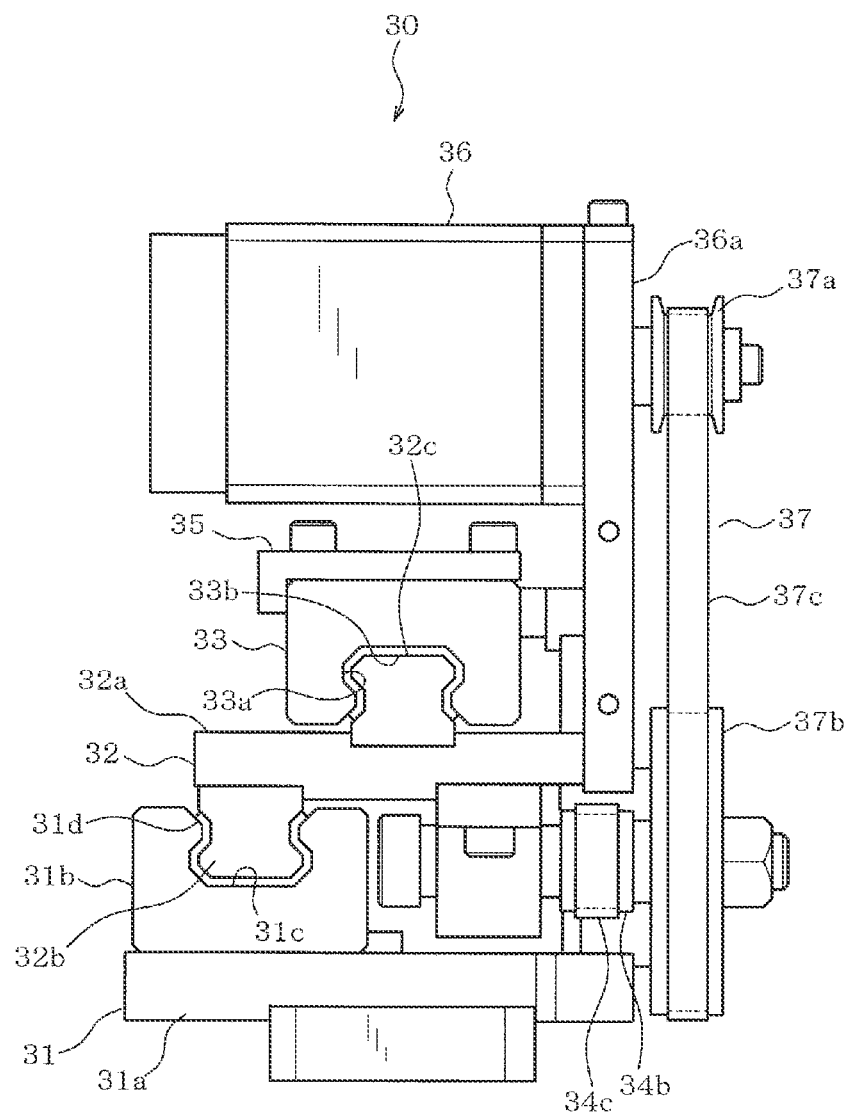
FIG. 4 is a rear view of the device as viewed from a direction of an arrow D of FIG. 2.

The horizontal multistage telescopic device 30 has a configuration as shown in FIGS. 2 to 4. Referring to these figures, the configuration is described. The horizontal multistage telescopic device 30 includes a base 31, slider 32, movable block 33 corresponding to the output arm support, movement mechanism 34, output arm 35, motor 36 and rotation transmission mechanism 37 corresponding to the rotation transmitting member. The base 31 is configured by mounting a guide block 31b corresponding to the slider support to a base body 31a. The guide block 31b is provided with a guide groove 31c to which a slider receiver 31d (see FIG. 4) having good sliding properties is mounted. Although not specifically shown, the slider receiver 31d is configured by a direct-acting ball bearing in which a plurality of balls are arranged in a direct-acting direction.

The slider 32 has a slider body 32a in a long plate-like shape. The slider body 32a has a surface (lower surface in FIGS. 2 to 4) which is provided with a slider guide 32b in a projected shape. The slider guide 32b has substantially the same length as the length of the slider body 32a in a longitudinal direction and is mounted to the slider body 32a throughout the length thereof in the longitudinal direction. The slider body 32a has the other surface (upper surface in FIGS. 2 to 4) which is provided with an output arm guide 32c in a projected shape. The output arm guide 32c has substantially the same length as the length of the slider body 32a in the longitudinal direction and is mounted to the slider body 32a throughout the length thereof in the longitudinal direction. The slider 32 is ensured to have horizontal width dimensions larger than those of the base 31.

The slider guide 32b of the slider 32 is movably inserted into and supported by the slider receiver 31d of the guide groove 31c of the base 31. The slider 32 is movable in a horizontal direction indicated by an arrow X1 and in a direction opposite thereto indicated by an arrow X2.

FIG. 2 shows a state where the slider 32 is at a movement limitation position, as a home position, in the direction of the arrow X2.

The output arm 35 is in a long plate-like shape and has an end in the direction of the arrow X2 (corresponding to the second direction), the end being integrally provided with the movable block 33. The output arm 35 is expanded from the movable block 33 in the direction of the arrow X1 (corresponding to the first direction).

The movable block 33 has horizontal dimensions smaller than those of the slider 32 and is provided with a guide groove 33a on one surface thereof, with an output arm receiver 33b (see FIG. 4) having good sliding properties being mounted to the guide groove 33a. Although not specifically shown, the output arm receiver 33b is configured by a direct-acting ball bearing in which a plurality of balls are arranged in a direct-acting direction.

The output arm receiver 33b is movably inserted into the output guide 32c of the slider 32 to support the movable block 33.

The output arm 35 has an end in the direction of the arrow X1 to which an end effector, such as a hand or a drill, is mounted (see parts (a) to (c) of FIG. 1).

The movement mechanism 34 is configured by a first pulley 34a, as the first rotor, a second pulley 34b, as the second rotor, and a closed-loop belt 34c, as the linear member. The first and second pulleys 34a and 34b have respective outer peripheries which are each provided with concavo-convex engagement portions, while the belt 34c has an inner surface which is provided with concavo-convex engagement portions.

The first pulley 34a is rotatably mounted to a mounting member 34d which is provided to an end of the slider 32 in the direction of the arrow X1. The second pulley 34b is rotatably mounted to a mounting member 34e which is provided to the other end of the slider 32 in the direction of the arrow X2. The belt 34c is mounted across the pulleys 34a and 34b. A part of the belt 34c is connected to the base 31 via a connector 34f. Another part of the belt 34c, which is extremely opposite to the part connected to the base 31 via a connector 34f, is connected to the movable block 33 via a connector 34g. The movement mechanism 34 is configured such that, as the slider 32 moves in the direction of the arrow X1 or X2, the movable block 33 and the output arm 35 are moved in the same direction relative to the slider 32.

When the slider 32 is moved by the movement mechanism 34 from the home position toward the direction of the arrow X1, the output arm 35 is moved toward the direction of the arrow X1 by a distance equal to or more than a stroke of movement of the slider 32, by the movement of the movable block 33 relative to the slider 32 in the direction of the arrow X1.

The motor 36 is mounted to an end of the slider 32 in the direction of the arrow X2 (i.e., the second direction) via a mounting member 36a. In this case, the slider 32 is positioned above the base 31, while the output arm 35 is positioned above the slider 32. The motor 36 is provided being spaced apart upward from the upper surface (upper surface in FIGS. 2 and 3) of the slider 32 by the interposition of the mounting member 36a so as not to interfere with the movement regions of the movable block 33 and the output arm 35. The rotation direction of the motor 36 can be inverted.

The rotation transmission mechanism 37, as the rotation transmitting member, is configured by a belt-type rotation transmission mechanism. The rotation transmission mechanism 37 includes a driving pulley 37a (corresponding to the driving rotor), a driven pulley 37b (corresponding to the driven rotor), and a belt 37c (corresponding to the transmission linear member). The driving pulley 37a has an outer periphery which is provided with concave-convex engagement portions at a predetermined pitch. The driven pulley 37b has an outer periphery which is similarly provided with concave-convex engagement portions at a predetermined pitch. The belt 37c is a closed-loop belt and has an inner surface which is similarly provided with concave-convex engagement portions at a predetermined pitch. The driving pulley 37a is mounted to a rotary shaft of the motor 36, while the driven pulley 37b is mounted to a rotary shaft (not shown) of the second pulley 34b. The belt 37c is mounted across the driving pulley 37a and the driven pulley 37b. The rotation transmission mechanism 37 is provided at an end of the slider 32 in the direction of the arrow X2, and transmits the rotation of the motor 36 to the second pulley 34b to rotate and drive the second pulley 34b.

As shown in the parts (a) to (c) of FIG. 1, in the horizontal multistage telescopic device 30 configured as described above, the base 31 is mounted to the elevator member 22 of the elevator device 20.

Figure 5:
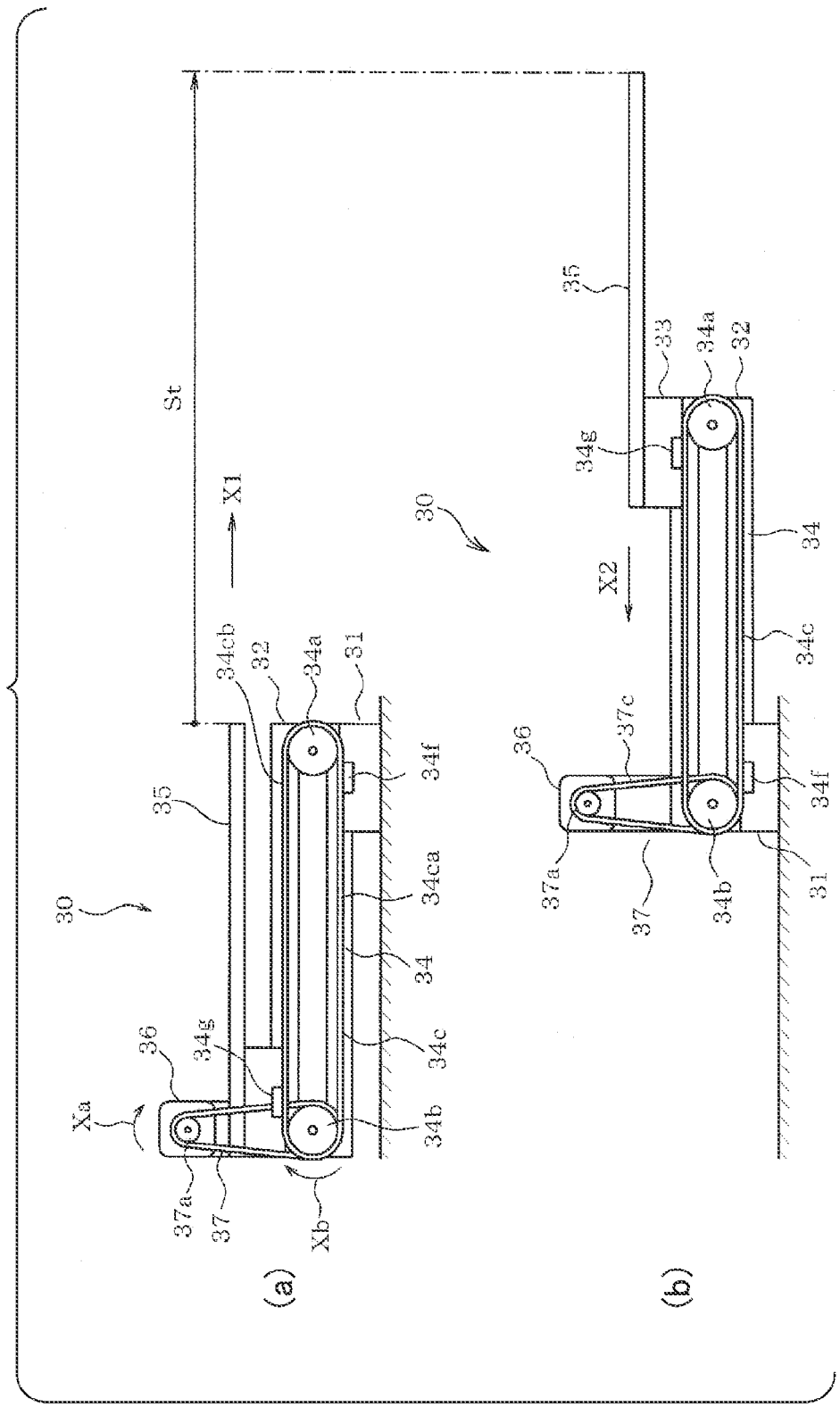
FIG. 5 shows diagrams schematically illustrating the basic configuration of the device to explain its movement, the device being in a state where the output arm is at the home position, and has moved by a distance corresponding to an aimed stroke, respectively.

Hereinafter is described an operation of the horizontal multistage telescopic device 30 as it stands alone. FIG. 5 shows diagrams schematically illustrating the basic configuration of the horizontal multistage telescopic device 30 (hereinafter also just referred to as telescopic device 30). A part (a) of FIG. 5 shows a state where the slider 32 and the output arm 35 are at their home positions. When the motor 36 is rotated in a direction indicated by an arrow Xa from this state, the second pulley 34b of the movement mechanism 34 is rotated in the same direction (direction indicated by an arrow Xb) via the rotation transmission mechanism 37.

Then, the second pulley 34b rotates the belt 34c via its lower side 34ca (see the part (a) of FIG. 5A) in the direction of the arrow Xa. In this case, since a part of the lower side 34ca is connected to the base 31, the rotation of the second pulley 34b relative to the belt 34c generates a reaction force in the belt 34c. The reaction force allows the second pulley 34b to move relative to the belt 34c to the direction of the arrow X1 together with the slider 32. In this case, an upper side 34cb of the closed-loop belt 34c moves relative to the slider 32 in the direction of the arrow X1 (the lower side 34ca moves in the direction of the arrow X2). Thus, the movable block 33 connected to the upper side 34cb of the belt 34c moves further in the direction of the arrow X1 relative to the slider 32 that is moving in the direction of the arrow X1. In this way, as shown in a part (b) of FIG. 5, the output arm 35 is permitted to move by a distance corresponding to an aimed stroke St. When the motor 36 is rotated in a direction inverse of the arrow Xa from the state shown in the part (b) of FIG. 5, an operation that is reverse of what is described above is performed to return to the state shown in the part (a) of FIG. 5. In this case, the motor 36 and the rotation transmission mechanism 37 move together with the slider 32. However, if the output arm 35 is moved by a distance corresponding to a maximum stroke, the motor 36 and the rotation transmission mechanism 37 do not move further than the base 31 toward the direction of the arrow X1 because the motor 36 and the rotation transmission mechanism 37 are located at an end of the slider 32 in the direction of the arrow X2.

Figure 6:
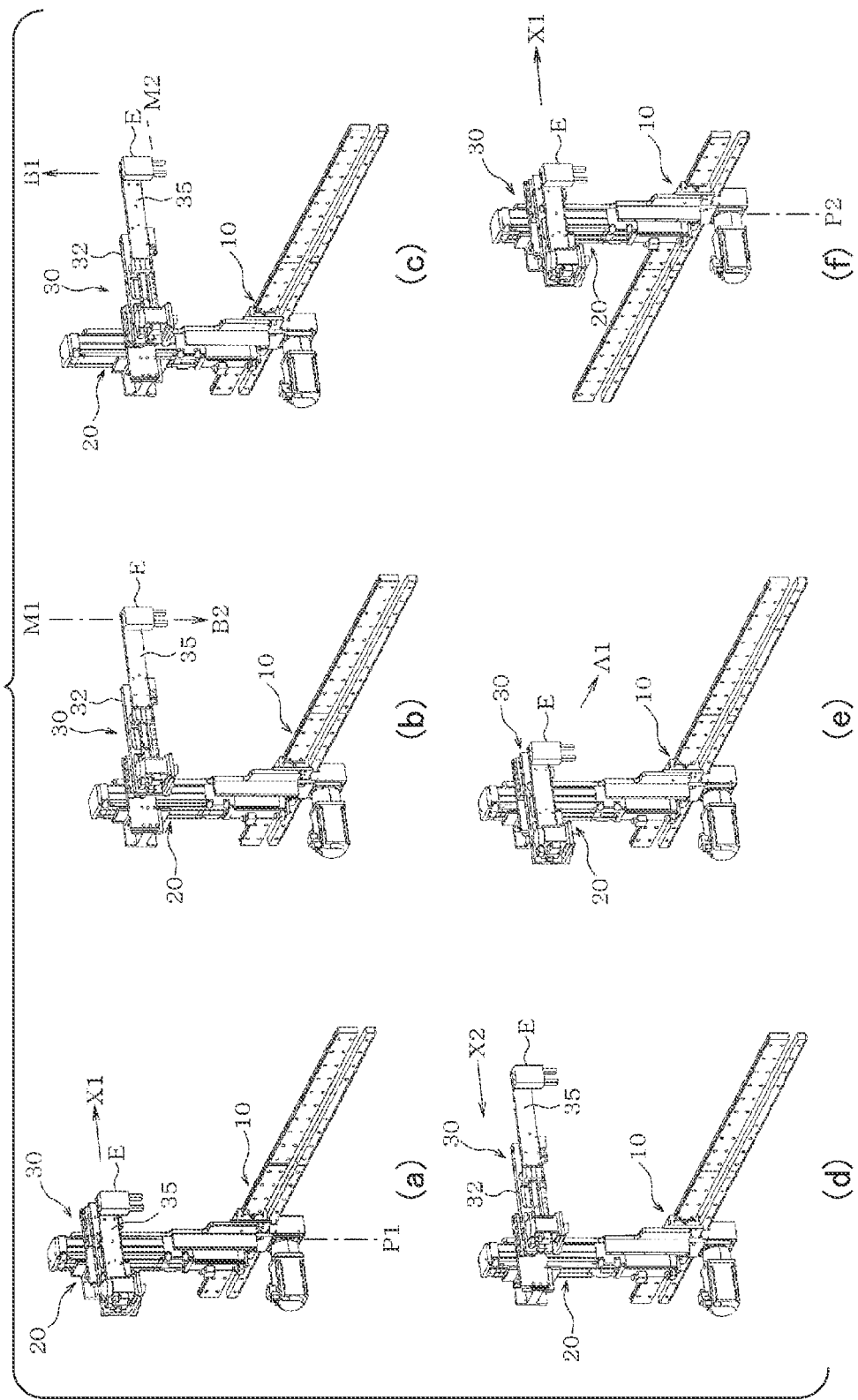
FIG. 6 shows diagrams illustrating the movement of the robot in chronological order.
Figure 7:
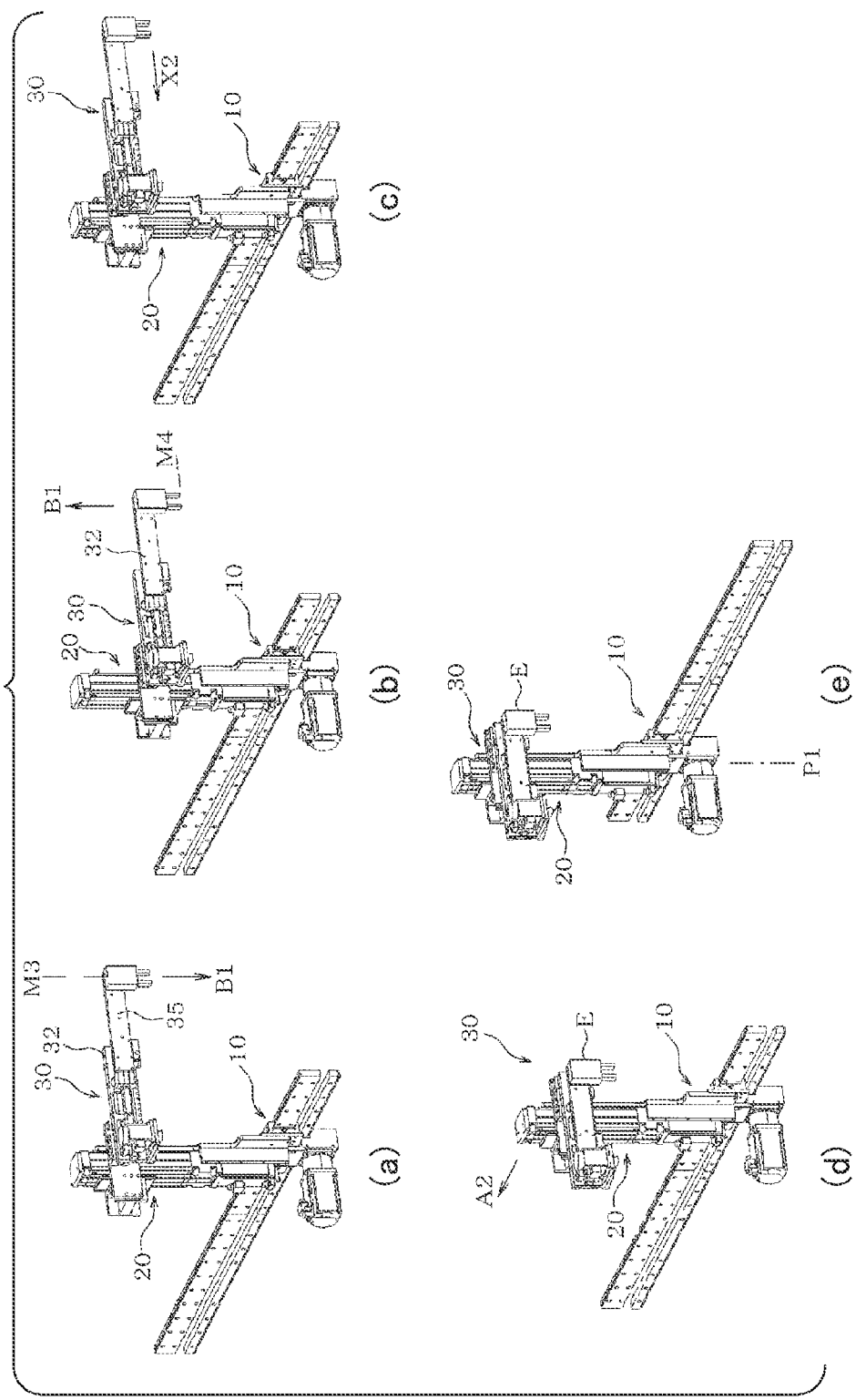
FIG. 7 shows diagrams illustrating the movement of the robot in chronological order.
Figure 8:
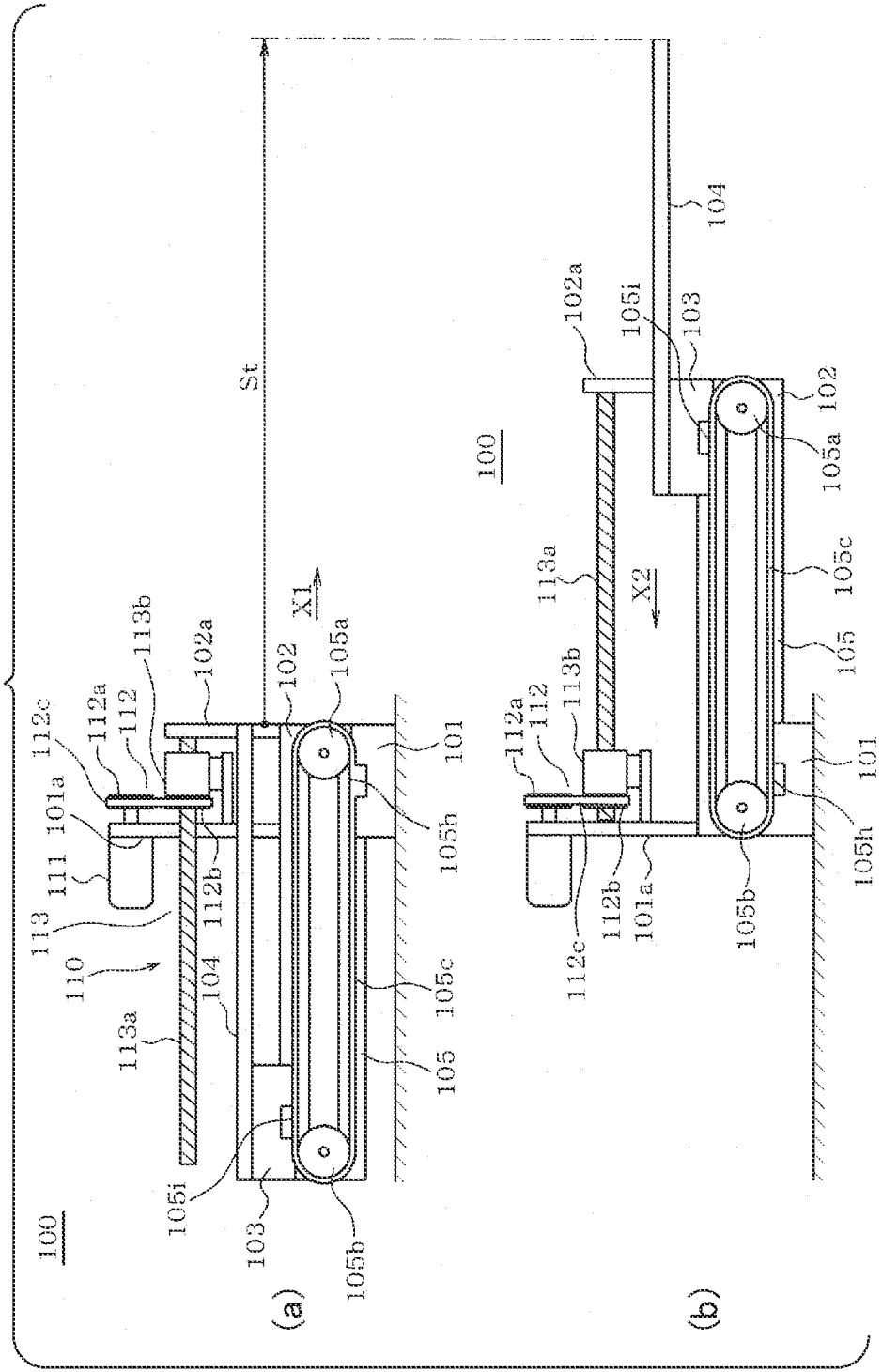
FIG. 8 shows diagrams illustrating an example of a horizontal multistage telescopic device based on conventional art, the diagrams corresponding to the diagrams shown in FIG. 5.
Figure 9:
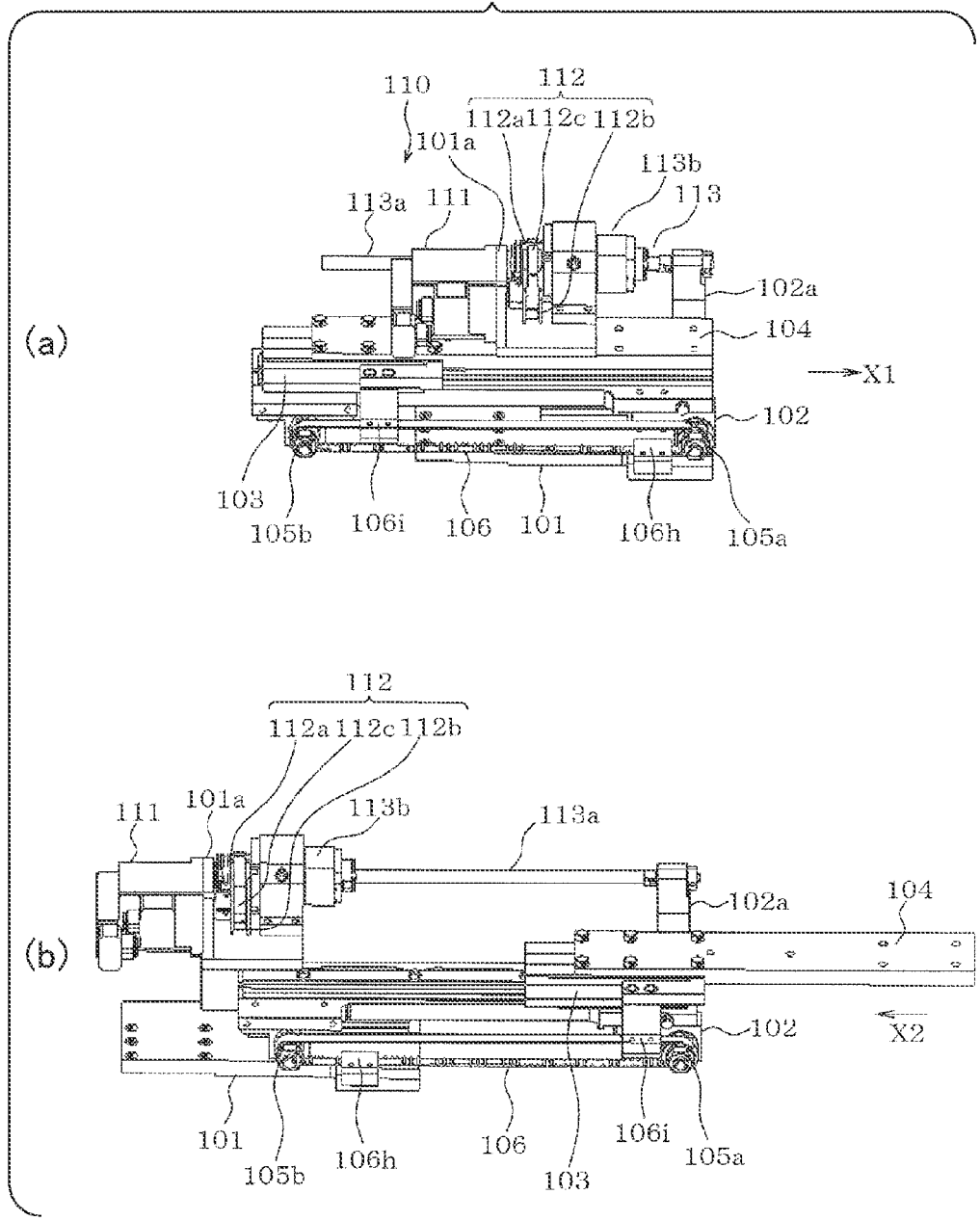
FIG. 9 shows perspective views illustrating the device in a state where the output arm is at a home position, and has been moved, respectively.
Figure 10:
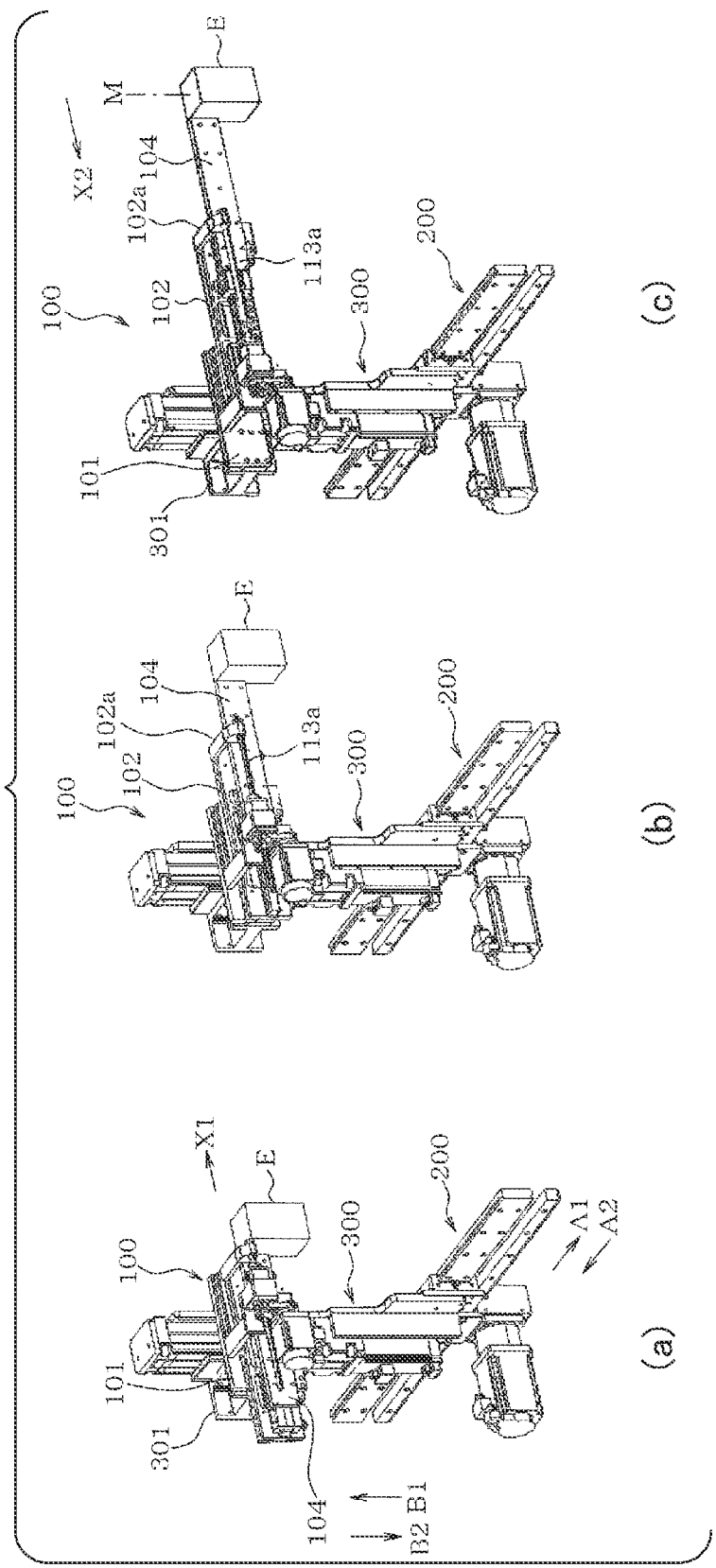
FIG. 10 shows diagrams corresponding to the views shown in FIG. 1.

Referring now to FIGS. 6 and 7, hereinafter is described, by way of an example, an operation of the industrial robot 1 which is configured by combining the carrier device 10, the elevator device 20 and the telescopic device 30. The order of operation is: FIG. 6, part (a); to FIG. 6, part (b); to FIG. 6, part (c); to FIG. 6, part (d); to FIG. 6, part (e); to FIG. 6, part (f); to FIG. 7, part (a); to FIG. 7, part (b); to FIG. 7, part (c); to FIG. 7, part (d); and to FIG. 7, part (e) (which is the same as FIG. 6, part (a)). It should be noted that FIG. 1, part (a) shows the same state as that in FIG. 6, part (a); FIG. 1, part (c) shows the same state as that in FIG. 6, part (b); and FIG. 1, part (b) shows a state in the midst of transition from the state of FIG. 1, part (a) to the state of FIG. 1, part (c).

In FIG. 6, part (a), the industrial robot 1 is at the home position, i.e. the slider 32 and the output arm 35 are at their home positions, while the telescopic device 30 is at a predetermined position P1 above the carrier rail 11. From this state, the output arm 35 is moved in the direction of the arrow X1 with the control of the motor 36 of the telescopic device 30 to have the end effector E reached a horizontal target coordinate M1 shown in FIG. 6, part (b). Then, the telescopic device 30 is lifted down (in the direction of the arrow B2) by the elevator device 20 to have the end effector E reached a vertical target coordinate M2 (FIG. 6, part (c)). The end effector E carries out a given operation at the coordinate M2. After that, the telescopic device 30 is lifted up by the elevator device 20 (in the direction of the arrow B1) to return to the original level (FIG. 6, part (d)).

Then, the telescopic device 30 is actuated to return the output arm 35 to the home position (see FIG. 6, part (e)). After that, the carrier device 10 is actuated to transfer the telescopic device 30 in the direction of the arrow A1 to bring the telescopic device 30 to a next target work position P2 (FIG. 6, part (f)). Then, the telescopic device 30 is actuated to move the output arm 35 to the direction of the arrow X1 to thereby allow the end effector E to reach a horizontal target coordinate M3 (FIG. 7, part (a)). Then, the elevator device 20 is actuated to lift down the telescopic device 30 (in the direction of the arrow B2) to allow the telescopic device 30 to reach a vertical target coordinate M4 (FIG. 7, part (b)). In this state, the end effector E carries out a given operation.

After that, the telescopic device 30 is lifted up to the original level by the elevator device 20 (FIG. 7, part (c)) and then the telescopic device 30 is actuated to have the output arm 35 returned to the home position (FIG. 7, part (d)). Then, the carrier device 10 is actuated to return the telescopic device 30 to the original position P1 above the carrier rail 11 (FIG. 7, part (e)). Then, the foregoing motions are repeatedly performed.

In the motions described above, when the output arm 35 of the telescopic device 30 has been expanded to the horizontal target coordinate M1 from the home position (FIG. 1, part (c) and FIG. 6, part (b)), it has been usual, in the conventional art, that the tip of the output arm finely vibrates up and down (that is, residual vibration). However, according to the present embodiment, the residual vibration can be minimized as described below.

In the present embodiment, without being obsessed with the idea of fixing a motor to a base, the motor 36 is mounted to the slider 32 that is a moving member. In addition, in place of the conventional art of directly pushing or pulling a slider by means of a ball screw device, the slider 32 includes the rotation transmission mechanism 37 that transmits the rotation of the motor 36 to the second pulley 34b of the movement mechanism 34. Accordingly, the slider 32 is ensured to move (be self-propelled) by driving and rotating the second pulley 34b. Thus, the slider can be moved without using the ball screw device 113 of conventional art. In this way, since the conventional ball screw device 113 can be eliminated, the weight corresponding to the ball screw and the mounting end plate can be reduced.

In particular, in the present embodiment, the motor 36 and the rotation transmission mechanism 37 are provided to an end of the slider 32 in the direction of the arrow X2 (corresponding to the second direction). Therefore, in a state where the telescopic device 30 has expanded the output arm 35 by a distance corresponding to the maximum stroke, the motor 36 and the rotation transmission mechanism 37 are present on the other side of the output arm 35 relative to the base 31. Thus, the motor 36 and the rotation transmission mechanism 37 do not act as moment of load on the output arm 35.

Accordingly, moment of load is mitigated when the output arm 35 is expended from the home position to the horizontal target coordinate M1 or M3. As a result, the residual vibration in the tip of the output arm 35 is mitigated. Thus, immediately after the expansion of the output arm 35 from the home position to the horizontal target coordinate M1 or M3, the standby time for the convergence of the residual vibration can be extremely shortened. Thus, the movement speed as a robot is increased, thereby contributing to the enhancement of productivity.

Owing to the mitigation of moment of load as described above, the load imposed on the parts of the telescopic device 30 can also be mitigated to thereby elongate the life of the robot. Further, the elimination of the ball screw device can lead to reducing the number of parts as well as the cost.

As described above, according to the present embodiment, the second pulley 34b of the movement mechanism 34 is driven to move the slider 32. Accordingly, the movement mechanism 34 for moving the movable block 33 and the output arm 35 can be used as a movement mechanism of the slider 32.

When the telescopic device 30 is lifted down and up by the elevator device 20 in a state where the slider 32 and the output arm 35 of the telescopic device 30 are expanded, moment of load is further increased due to the application of vertical acceleration to the slider 32 and the output arm 35. However, since intrinsic moment of load has been mitigated as described above, the residual vibration of the output arm 35 is also mitigated in lifting down and up the telescopic device 30.

There may be a concern that the provision of the rotation transmission mechanism 37 in the present embodiment increases the weight accordingly. However, considering that a ball screw device used to include a rotation transmission mechanism as well, the rotation transmission mechanism 37 of the present embodiment does not newly impose a weight load.

Since the elimination of the ball screw device from the telescopic device 30 has reduced the weight accordingly, the load imposed on the elevator device 20 and the carrier device 10 can be reduced. This also contributes to elongating the life of the robot.

There may be a concern that the weight of the robot is increased because the diameter of the driven pulley 37b is larger than that of the driving pulley 37a. However, the concern can be eliminated by providing a weight reducing structure, e.g., forming recesses or holes, in the driven pulley 37b. In contrast, in the conventional ball screw device 113, it has been difficult to form holes or recesses in a threaded rod and thus there has been a limitation in weight reduction.

In the first embodiment, a positional relationship is established such that the slider 32 is located above the base 31, while the output arm 35 is located above the slider 32. Therefore, the motor 36 is provided being spaced apart upward from the upper surface of the slider 32 so as not to interfere with the movement region of the output arm 35.

In the first embodiment, the rotation transmission mechanism 37 (rotation transmitting member) transmits the torque of the motor 36, which is spaced apart upward from the upper surface of the slider 32, to the second pulley 34b, as the second rotor. The rotation transmission mechanism 37 is configured by mounting the driving pulley 37a, as the driving rotor, to the rotary shaft of the motor 36, mounting the driven pulley 37b, as the driven rotor, so as to coaxially and integrally rotate with the second pulley 34b, and mounting the belt 37c, as the transmission linear member, across the driving pulley 37a and the driven pulley 37b.

Thus, the torque of the motor 36, which is spaced apart upward from the upper surface of the slider 32, can be transmitted to the second pulley 34b of the movement mechanism 34.

In the first embodiment, the first pulley 34a, as the first rotor, and the second pulley 34b, as the second rotor, in the movement mechanism 34 are each configured to have concave-convex engagement portions at a predetermined pitch in the outer periphery. Further, the belt 34c, as the linear member, is configured to have concave-convex engagement portions at the same predetermined pitch in the inner surface. This configuration facilitates, for example, settings of the length of the belt 34c and the distance between the connecting positions in the belt 34c relative to the base 31 and relative to the movable block 33, or facilitates changes in the settings.

Specifically, since the engagement portions of the belt 34c are arranged at a predetermined pitch, the length of the belt 34c can be set in terms of the number of the engagement portions. Further, where the connecting positions in the belt 34c relative to the base 31 and relative to the movable block 33 are set to extremely opposite positions, the extreme opposite positions can be determined in terms of the number of the engagement portions. In this way, the settings as well as the changes in the settings are facilitated.

Since the first and second pulleys 34a and 34b as well as the belt 34c are configured to have engagement portions, unlike frictional transmission, slippage of the pulleys against the belt hardly occurs. This enhances rotation responsiveness and rotation synchrony of the first and second pulleys 34a and 34b to thereby enhance the operation accuracy as an industrial robot.

In the first embodiment, the driving pulley 37a, as the driving rotor, and the driven pulley 37b, as the driven rotor, of the rotation transmission mechanism 37 are each configured to have concavoconvex engagement portions at a predetermined pitch in the outer periphery, while the belt 37c, as the transmission linear member, is configured to have concavo-convex engagement portions at a predetermined pitch in the inner surface. Accordingly, unlike frictional transmission, slippage of the pulleys against the belt hardly occurs and no offset is caused in the torque transmission from the motor 36 to the second pulley 34b, enabling the movement mechanism 34 to responsively move without time lag.

Second Embodiment

Figure 11:
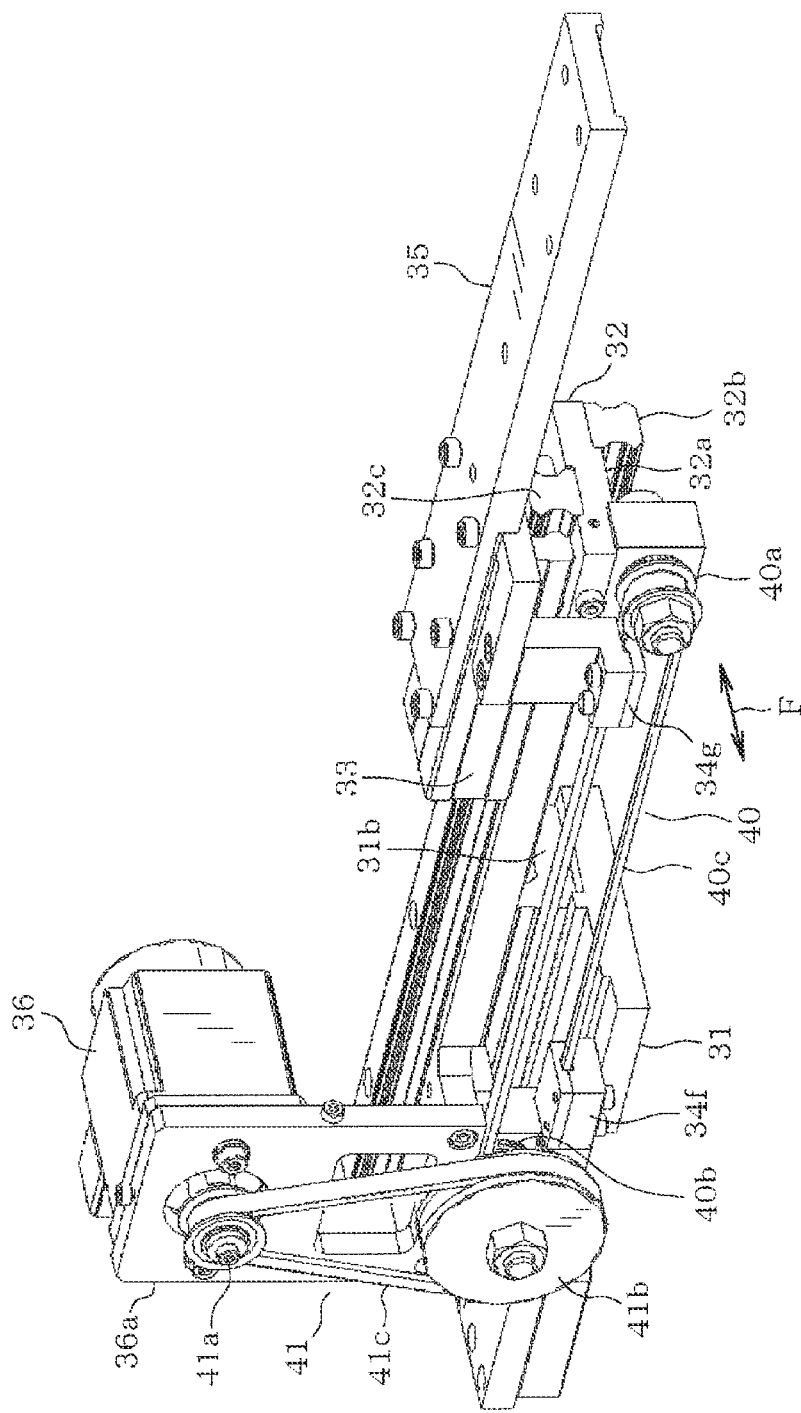
FIG. 11 is a diagram illustrating a horizontal multistage telescopic device according to a second embodiment of the invention, the diagram corresponding to FIG. 3.
Figure 12:
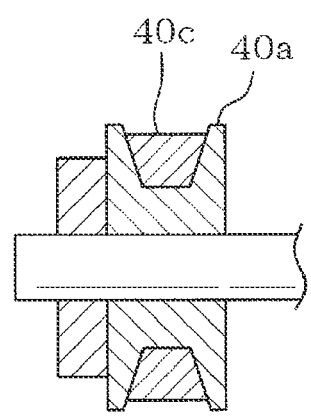
FIG. 12 is a vertical cross-sectional view illustrating a first pulley, according to the second embodiment.

FIGS. 11 and 12 illustrate a telescopic device according to a second embodiment of the present invention. It should be appreciated that, in the second and the subsequent embodiments, the components identical with or similar to those in the first embodiment are given the same reference numerals for the sake of omitting unnecessary explanation.

The telescopic device of the second embodiment includes a movement mechanism 40 and a rotation transmission mechanism 41 which are different from the movement mechanism 34 and the rotation transmission mechanism 37 of the first embodiment, respectively.

In the movement mechanism 40, a first pulley 40a, as the first rotor, and a second pulley 40b, as the second rotor, are each configured as a V pulley. Further, the linear member is configured by a closed-loop V belt 40c.

In the rotation transmission mechanism 41, a driving pulley 41a, as the driving rotor, and a driven pulley 41b, as the driven rotor, are each configured by a V pulley, while a belt 41c, as the transmission linear member, is configured as a V belt.

Industrial robots are required to exert initially intended accelerating and decelerating performances. In this regard, according to the second embodiment, the first and second pulleys 40a and 40b, as the first and second rotors, respectively, of the movement mechanism 40 are each configured as a V pulley, while the belt 40c, as the linear member, is configured by a V belt. Therefore, unlike a configuration using a flat belt, slippage is reduced by wedge effect. This configuration well suits to a robot that requires to have high transmission performance and accelerating and decelerating performances without slippage.

Industrial robots may suffer from vibration in various directions in individual parts, depending on the type of the works, trajectory of motion, or environments of use. Accordingly, pulleys may suffer from vibration in an axial direction (direction of an arrow F in FIG. 11). In this case, where the belt is a flat belt and the pulleys are flat pulleys, the pulleys may gradually depart from the belt in the axial direction due to the vibration and may reduce the bearing area between each of the pulleys and the belt. Since the belt, in this case, has to receive the rotation transmission with the small bearing area, deterioration of the belt is accelerated. In this regard, according to the second embodiment having the configuration as described above, the V belt 40c does not depart in the axial direction relative to the first and second pulleys 40a and 40b, irrespective of the above vibration acting in the axial direction. Thus, deterioration of the belt is prevented from being accelerated, contributing to elongating the life of the industrial robot 1. The same effect can be exerted in the rotation transmission mechanism 41.

Third Embodiment

Figure 13:
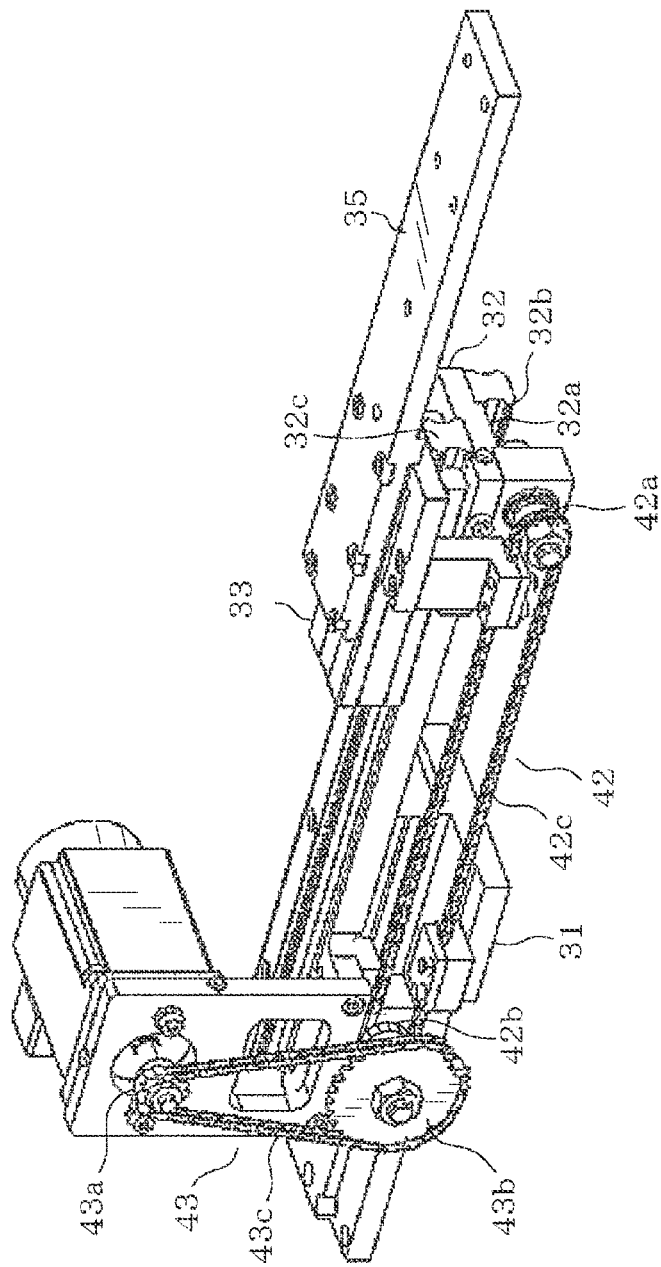
FIG. 13 is a diagram illustrating a horizontal multistage telescopic device according to a third embodiment of the invention, the diagram corresponding to FIG. 3.
Figure 14:
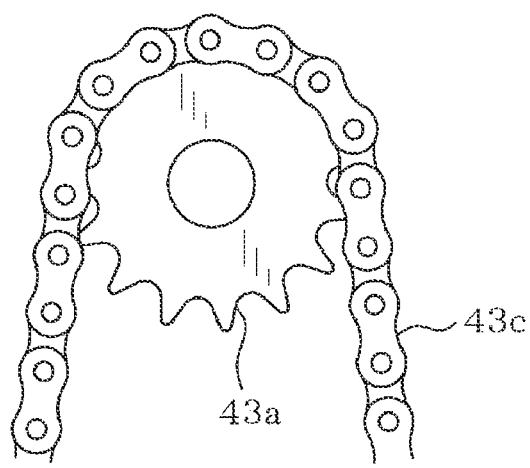
FIG. 14 is a front view illustrating a sprocket, according to the third embodiment.

FIGS. 13 and 14 illustrate a telescopic device according to a third embodiment of the present invention. The telescopic device of the third embodiment includes a movement mechanism 42 and a rotation transmission mechanism 43 which are different from the movement mechanism 34 and the rotation transmission mechanism 37, respectively, of the first embodiment.

The movement mechanism 42 includes sprockets 42a and 42b, as the first and second rotors, respectively, and a chain 42c, as the linear member, that engages with the sprockets 42a and 42b. The rotation transmission mechanism 43 includes sprockets 43a and 43b, as the driving rotor and the driven rotor, respectively, and a chain 43c, as the transmission linear member, that engages with the sprockets 43a and 43b.

When moment of load and weight load applied to the industrial robot 1 are large, the motor 36 is required to have large output torque. Where the rotation transmission mechanism and the movement mechanism are configured by a belt transmission mechanism, such large output torque may induce slippage of the pulleys against the belt, or may stretch the belt. In this regard, the movement mechanism 42 of the third embodiment is configured, as mentioned above, by the sprockets 42a and 42b, as the first and second rotors, respectively, and the chain 42c, as the linear member, that engages with the sprockets 42a and 42b. This configuration can eliminate the occurrence of slippage of the sprockets 42a and 42b against the chain 42, or the occurrence of stretch in the chain 42c, under the condition that the motor 36 generates large output torque.

The same advantageous effects are exerted in the rotation transmission mechanism 43 as well. As a consequence, the initially given motions can be guaranteed over a long period of time under the condition that the industrial robot 1 is applied with a large load.

Fourth Embodiment

Figure 15:
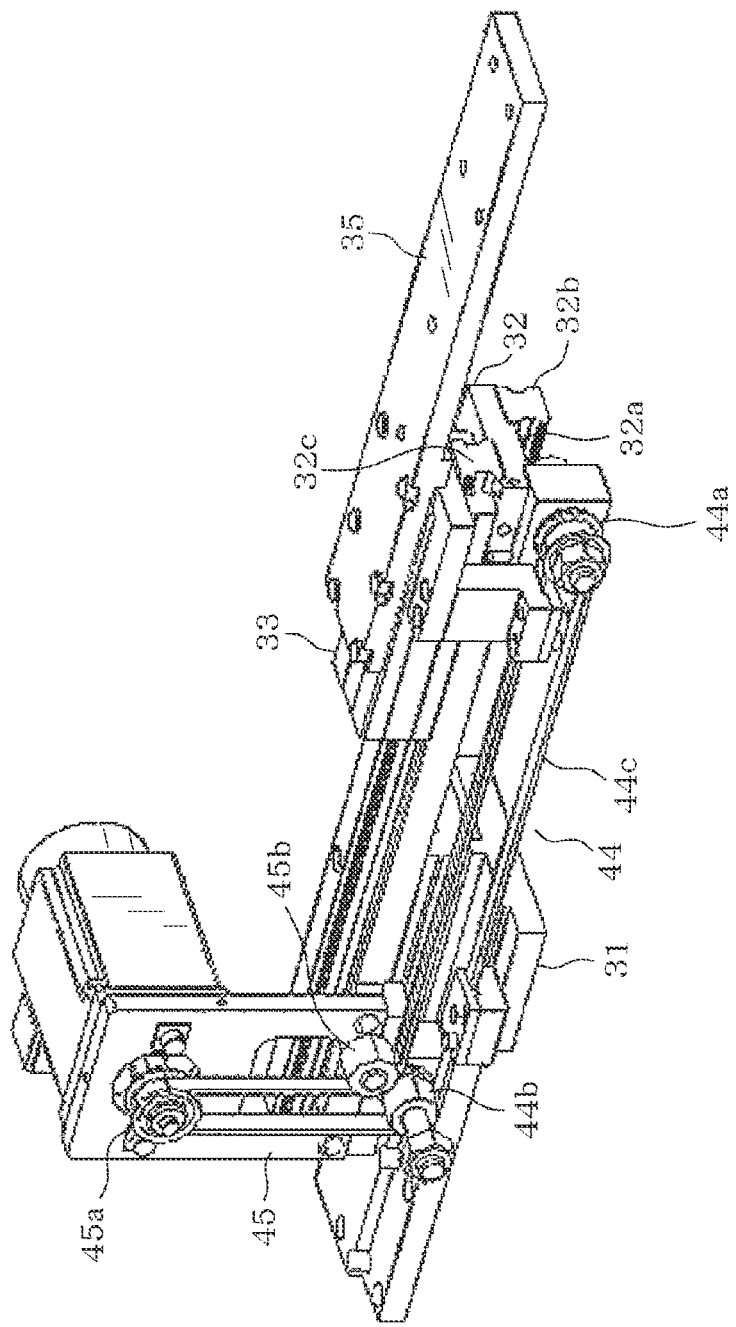
FIG. 15 is a diagram illustrating a horizontal multistage telescopic device according to a fourth embodiment of the invention, the diagram corresponding to FIG. 3.

FIG. 15 illustrates a telescopic device according to a fourth embodiment of the present invention. The telescopic device of the fourth embodiment includes a movement mechanism 44 and a rotation transmitting member 45 which are different from those in the first embodiment. The rotation transmitting member 45 includes a driving pulley 45a, as the driving rotor, which is mounted to the rotary shaft of the motor 36, and a direction change pulley 45b, as a direction change rotor, rotatably provided in the vicinity of a second pulley 44b, described later, as the second rotor.

The movement mechanism 44 is configured by mounting a belt 44c (flat belt), as the linear member, across a first pulley 44a (flat pulley), as the first rotor, and the second pulley 44b (flat pulley), as the second rotor, and across the driving pulley 45a (flat pulley) and the direction change pulley 45b (flat pulley) as well. The direction change pulley 45b is used for changing the moving direction of the flat belt 44c, i.e. in a direction from the motor 36 toward the first pulley 44a, or vice versa.

In the fourth embodiment, the belt 44c is shared between the movement mechanism 44 and the rotation transmitting member 44. In other words, the sole closed-loop belt 44c takes a roll of transmitting torque from the motor 36 to the second pulley 44b and actuating the movement mechanism 44. The fourth embodiment has the following advantageous effects other than those of the first embodiment.

Specifically, the belt 44 of the fourth embodiment is longer than the belts 34c and 37c of the first embodiment and solely used. Accordingly, when the belt is loosened due to the operation of the robot, the looseness occurs at one portion and the amount of the looseness is in proportion to the length of the belt 44. On the other hand, in the first embodiment, looseness is caused in the belts 34c and 37c but the amount of looseness in both of the belts is small because these belts are shorter than the belt 44. However, the total amount of looseness is substantially the same as the amount of looseness in the fourth embodiment. Although the total amount of looseness is substantially the same between the first and fourth embodiments, the looseness is likely to be unnoticed in the first embodiment because the looseness of each belt is small, whereas in the fourth embodiment, the looseness is noticed because the amount of the looseness is large. Accordingly, the time of maintenance can be figured out at an earlier occasion in the fourth embodiment.

The provision of two belts in the first embodiment makes it necessary to provide two belt-tension imparting mechanisms. However, in the fourth embodiment, use of the sole belt 44 needs use of only one belt-tension imparting mechanism.

In the fourth embodiment, the first and second rotors, the driving rotor and the direction change rotor may each be configured by a sprocket, while the linear member may be configured by a chain.

Fifth Embodiment

Figure 16:
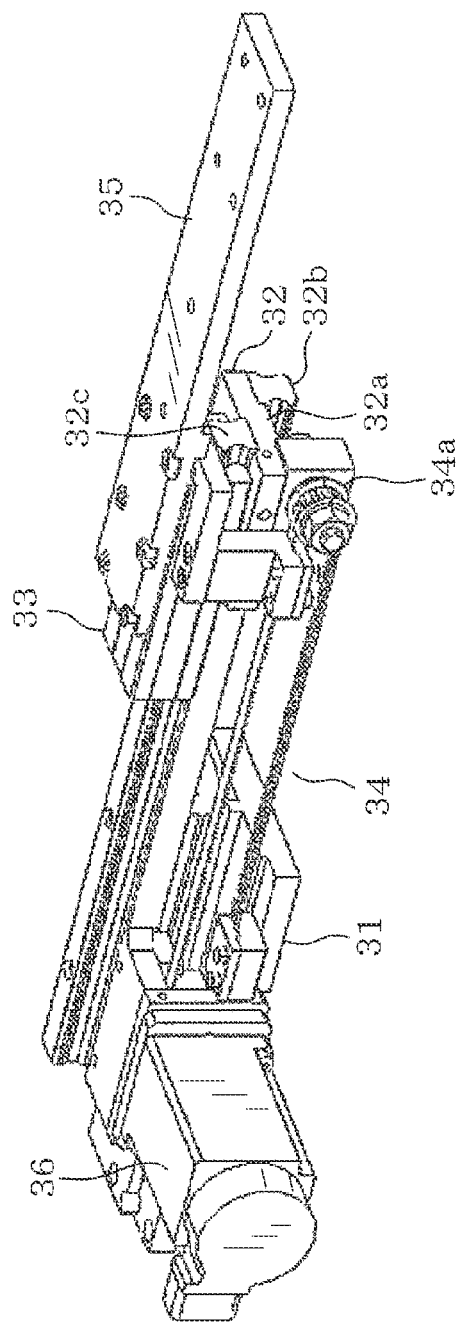
FIG. 16 is a diagram illustrating a horizontal multistage telescopic device according to a fifth embodiment of the invention, the diagram corresponding to FIG. 3.
Figure 17:
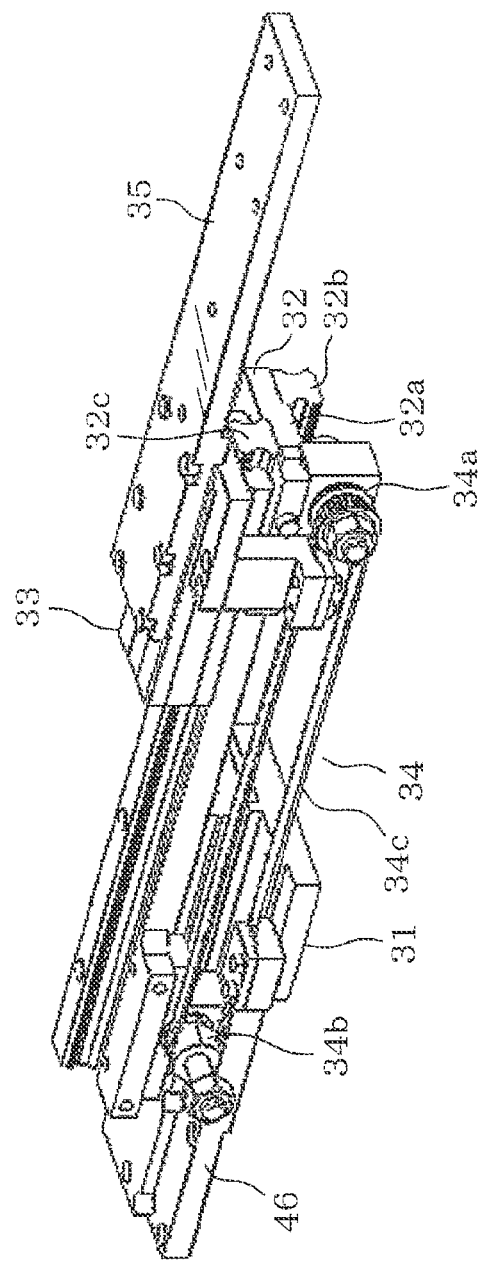
FIG. 17 is a perspective view illustrating the device, omitting a motor, according to the fifth embodiment.

FIGS. 16 and 17 illustrate a telescopic device according to a fifth embodiment of the present invention, which is different from the first embodiment in the following points. In the fifth embodiment, the motor 36 is provided to a side face of the slider 32 so as not to interfere with the movement regions of the movable block 33 and the output arm 35. The telescopic device of the fifth embodiment includes a rotation transmitting member 46 which is configured such that, for example, the second pulley 34b of the movement mechanism 34 is directly rotated by the motor 36 by directly connecting the rotary shaft of the motor 36 to the rotary shaft of the second pulley 34b, or directly connecting the rotary shaft of the motor 36 to the second pulley 34b.

According to the fifth embodiment, the motor 36 is mounted to a side face of the slider 32 so as not to interfere with the movement regions of the movable block 33 and the output arm 35. Accordingly, the rotation transmitting member 46 can use a configuration in which the second pulley 34b is directly rotated by the motor 36. Thus, the movement mechanism 34 can be directly driven by the motor 36, thereby enhancing accuracy in the operation as an industrial robot 1.

Sixth Embodiment

Figure 18:
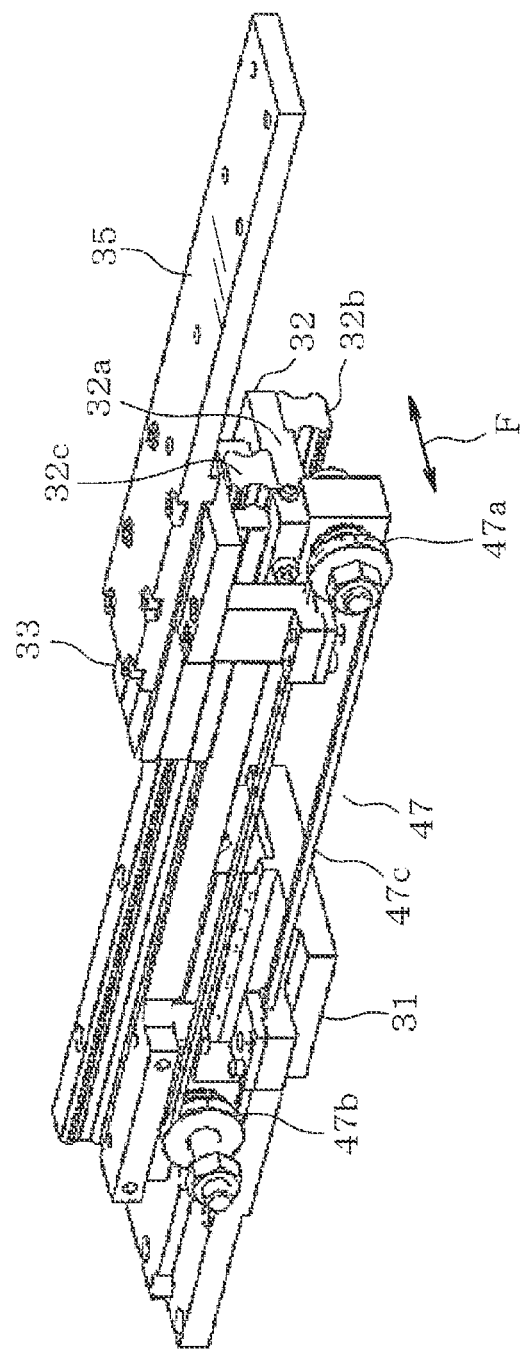
FIG. 18 is a diagram illustrating a horizontal multistage telescopic device according to a sixth embodiment of the invention, the diagram corresponding to FIG. 17.
Figure 19:
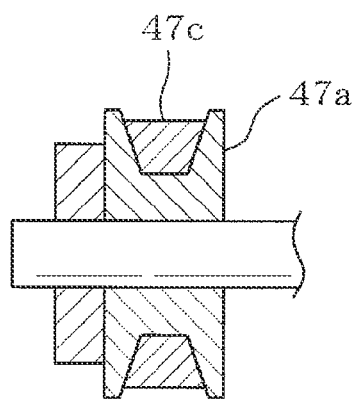
FIG. 19 is a vertical cross-sectional view illustrating a first pulley, according to the sixth embodiment.

FIGS. 18 and 19 illustrate a telescopic device according to a sixth embodiment of the present invention, which includes a movement mechanism 47 having a configuration different from that of the fifth embodiment. It should be noted that in the illustration of FIG. 18, the motor 36 is omitted. The movement mechanism 47 of the sixth embodiment is configured by a first pulley 47a, as the first rotor, a second pulley 47b, as the second rotor, and a V belt 47c, as the linear member.

As described in the second embodiment, the configuration of the sixth embodiment can exert high transmission performance owing to wedge effect, and thus well suits to an industrial robot that is required to have accelerating and decelerating performances without slippage. Accordingly, under the condition that the vibration in the axial direction (direction of the arrow F) as mentioned above acts on the industrial robot 1, or the movement mechanism 47, the V belt 47c does not depart in the axial direction relative to the first and second pulleys 47a and 47b. Thus, the V belt 47c does not suffer from earlier-stage deterioration, contributing to elongating the life of the industrial robot 1.

Seventh Embodiment

Figure 20:
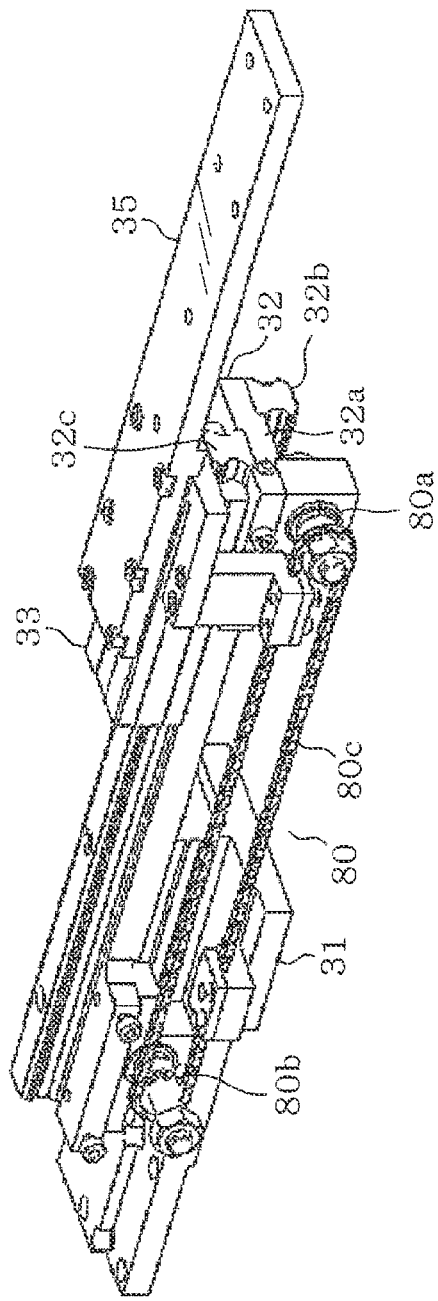
FIG. 20 is a diagram illustrating a horizontal multistage telescopic device according to a seventh embodiment of the invention, the diagram corresponding to FIG. 17.
Figure 21:
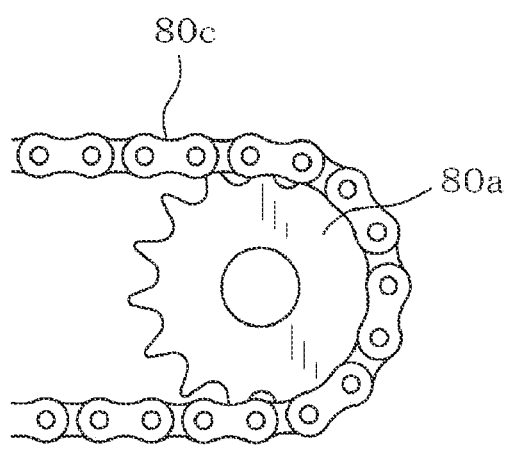
FIG. 21 is a front view illustrating a sprocket, according to the seventh embodiment.

FIGS. 20 and 21 illustrate a telescopic device according to a seventh embodiment of the present invention, which includes a movement mechanism 80 having a configuration different from the fifth embodiment. In the illustration of FIG. 20, the motor 36 is omitted. The movement mechanism 80 of the seventh embodiment includes sprockets 80a and 80b, as the first and second rotors, respectively, and a chain 80c, as the linear member, that engages with the sprockets 80a and 80b.

In the seventh embodiment, neither slippage is caused in the sprockets 80a and 80b relative to the chain 80c, nor stretch is caused in the chain 80c under the condition that the output torque of the motor 36 is large. As a result, in the event that the output torque of the motor 36 is increased when the industrial robot 1 is applied with a large load, the initially given motions of the robot can be guaranteed over a long period of time.

Eighth Embodiment

Figure 22:
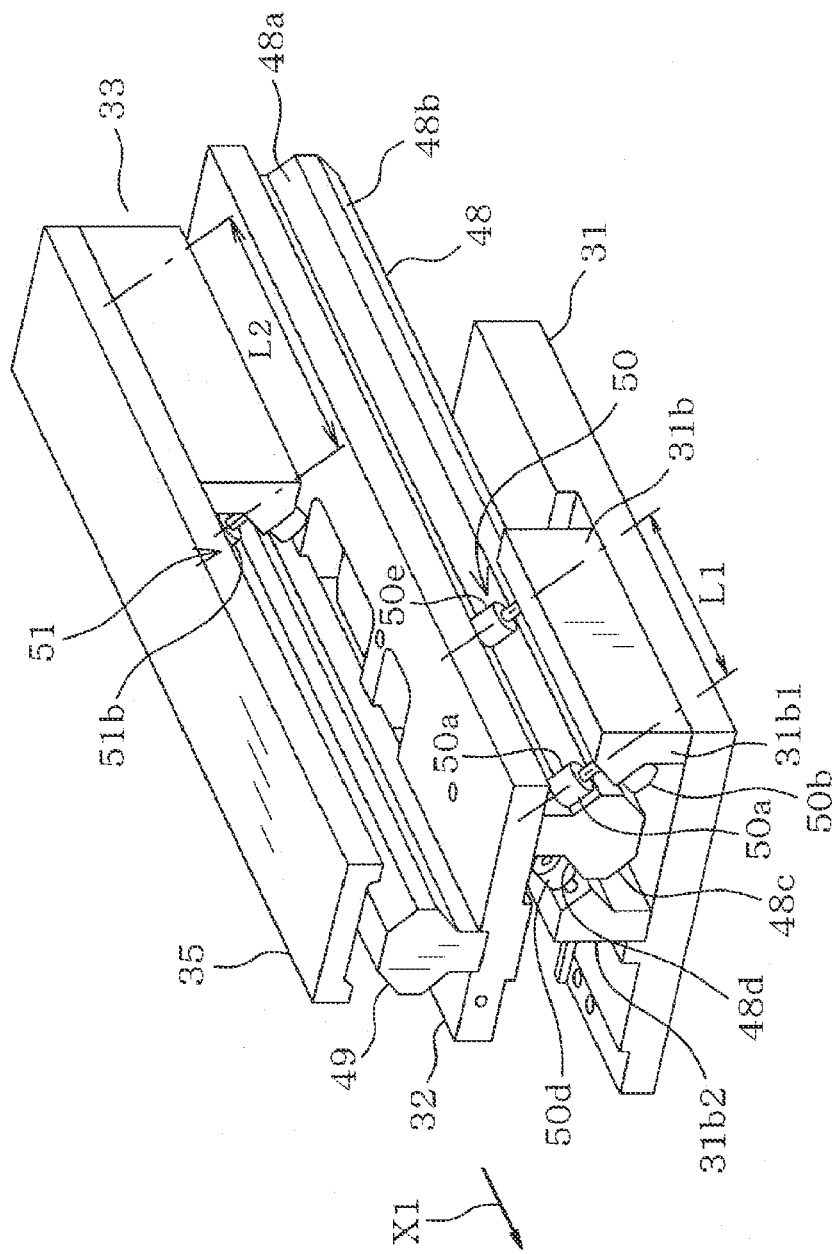
FIG. 22 is a diagram illustrating a horizontal multistage telescopic device according to an eighth embodiment of the invention, omitting a motor and a movement mechanism, the diagram corresponding to FIG. 2.
Figure 23:
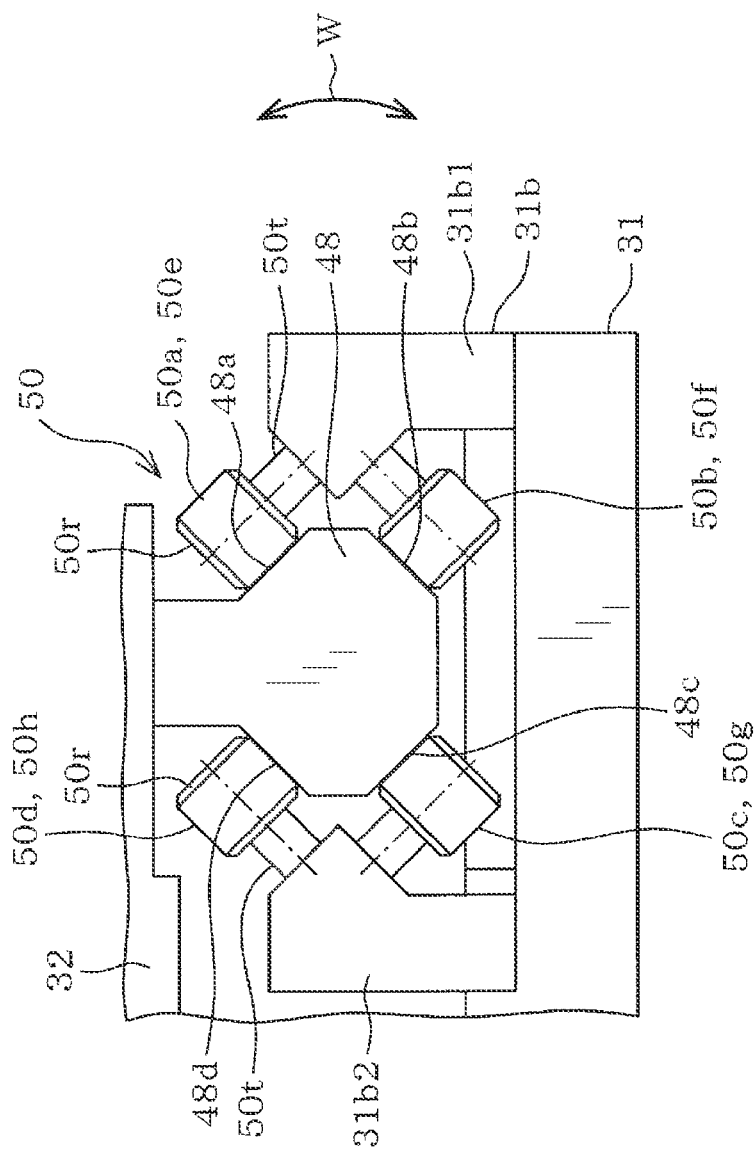
FIG. 23 is a front view illustrating first cam followers, according to the eighth embodiment.
Figure 24:
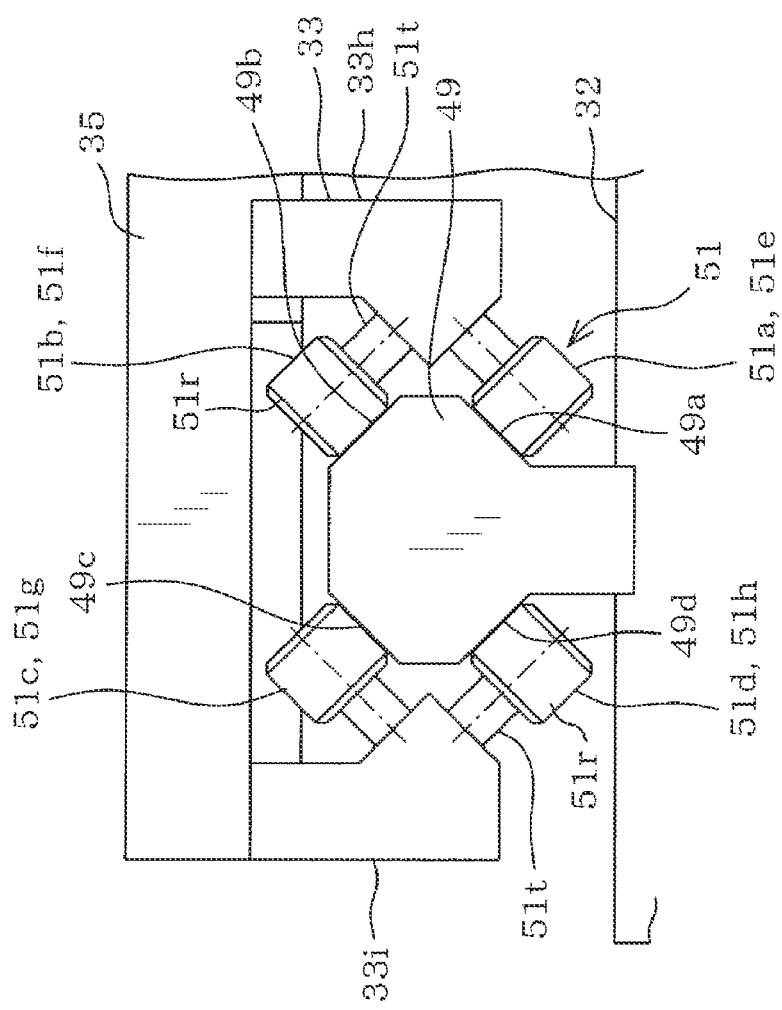
FIG. 24 is a front view illustrating second cam followers, according to the eighth embodiment.

FIGS. 22 to 24 illustrate a telescopic device according to an eighth embodiment of the present invention, which is different from the first embodiment in the support configurations of the slider 32 and the output arm 35. The telescopic device of the eighth embodiment includes a slider guide 48 having first to fourth flat surfaces 48a to 48d which extend in a longitudinal direction. Substantially a right angle is formed between adjacent surfaces, i.e. between the surfaces 48a and 48b, between the surfaces 48b and 48c, between the surfaces 48c and 48d, and between the surfaces 48d and 48a.

The telescopic device further includes an output arm guide 49 which, similar to the slider guide 48, has first to fourth flat surfaces 49a to 49d that extend in a longitudinal direction. Similar to the slider guide 48, the adjacent surfaces of the output arm guide 49 substantially form a right angle.

The telescopic device also includes a guide block 31*b* corresponding to the slider support, which is configured by segment blocks 31*b*1 and 31*b*2 separately located on the left and the right.

The movable block 33 corresponding to the output arm support is configured by segment blocks 33*h* and 33*i* separately located on the left and the right.

The telescopic device further includes a slider receiver 50 which is configured by two sets of cam followers, one set including four first cam followers 50*a* to 50*d*, the other set including four first cam followers 50*e* to 50*h*. The set of the first cam followers 50*a* to 50*d* is provided to an end of the guide block 31*b* of the base 31 so as to be in contact with the surfaces 48*a* to 48*d*, respectively, of the slider guide 48. The set of the first cam followers 50*e* to 50*h* is provided to the other end of the guide block 31*b* of the base 31 so as to be in contact with the surfaces 48*a* to 48*d*, respectively, of the slider guide 48. The set of the first cam followers 50*a* to 50*d* is spaced part by a predetermined distance L1 from the set of the first cam followers 50*e* to 50*h*. The first cam followers 50*a* to 50*h* are each configured by a rotating part 50*r* and a mounting part 50*t*, both being in a cylindrical shape, with the mounting part 50*t* being mounted to the guide block 31*b*.

The cam followers 50*a* to 50*h* are in line contact with the corresponding surfaces 48*a* to 48*d*.

The arm receiver 51 is configured by two sets of cam followers, one set including four second cam followers 51*a* to 51*d*, the other set including four second cam followers 51*e* to 51*h*. The set of the second cam followers 51*a* to 51*d* is provided to an end of the movable block 33, as the output arm support, so as to be in contact with the surfaces 49*a* to 49*d*, respectively, of the output arm guide 49. The set of the second cam followers 51*e* to 51*h* is provided to the other end of the movable block 33 so as to be in contact with the surfaces 49*a* to 49*d*, respectively, of the output arm guide 49. The set of the second cam followers 51*a* to 51*d* is spaced part by a predetermined distance L2 from the set of the second cam followers 51*e* to 51*h*. The second cam followers 51*a* to 51*h* are each configured by a rotating part 51*r* and a mounting part 51*t*, both being in a cylindrical shape, with the mounting part 51*t* being mounted to the movable block 33.

The cam followers 51*a* to 51*h* are in line contact with the corresponding surfaces 49*a* to 49*d*.

In the illustrations of FIGS. 22 to 24, the motor 36 and the movement mechanism 34 are omitted. In FIG. 22, the motor 36, not shown, actuates the movement mechanism 34 to move the slider 32 to the direction of the arrow X1 as described above, while the output arm 35 is moved faster than the slider 32. With the movement of the slider guide 48 of the slider 32, the first cam followers 50*a* to 50*h* rotate in a state of being in line contact with the corresponding surfaces 48*a* and 48*d* of the slider guide 48 to thereby allow the slider 32 to move with substantially no resistance. Further, the movement of the output arm 35 relative to the slider 32 causes the second cam followers 51*a* to 51*h* to rotate in a state of being in line contact with the output arm guide 49, while causing the second cam followers to move together with the output arm 35. Thus, the output arm 35 also moves with substantially no resistance relative to the slider 32.

If the slider receiver has four direct-acting ball bearings in each of which balls are arranged in a direct-acting direction, and if the direct-acting ball bearings are configured to be in contact with the corresponding surfaces 48*a* to 48*d* shown in FIG. 23, the balls of the direct-acting ball bearings are permitted to be in point contact with the individual surfaces 48*a* to 48*d*. This allows concentration of the weight load of the robot and the stress due to moment of load in expanding the output arm 35, on the point contact portions in the surfaces 48*a* to 48*d*. Thus, use of the robot over a long period of time with a large load may form bruise-like continuous concave trails along the movement loci of the individual balls in each of the surfaces 48*a* to 48*d*. This may cause backlash in the device and the backlash may lead to creating an erroneous movement trajectory of the slider 32. Use of such direct-acting ball bearings as the output arm receiver may also lead to the similar failure.

In this regard, in the eighth embodiment, the first cam followers 50*a* to 50*h* are in contact with the corresponding surfaces 48*a* to 48*d* of the slider guide 48. Accordingly, the first cam followers 50*a* to 50*h* can support the corresponding surfaces 48*a* to 48*d* of the slider guide 48 in a state of being in line contact therewith to thereby scatter the stress. Moreover, the spacing of the set of the first cam followers 50*a* to 50*d* from the set of the first cam followers 50*e* to 50*h* by the distance L1 can also contribute to scattering the stress against moment of load in expanding the slider 32 and the output arm 35. As a result, in the case where the robot is used over a long period of time with a large load, the slider 32 is prevented from creating an erroneous movement trajectory.

For example, in the case where moment of rotation as indicated by an arrow W in FIG. 23 acts on the slider 32, there is a concern that the slider 32 may be displaced in the direction of the arrow W. However, in the eighth embodiment, adjacent ones of the surfaces 48*a* to 48*d* of the slider guide 48 are formed so as to make substantially a right angle therebetween, and the first cam followers 50*a* to 50*h* are brought into line contact with the corresponding surfaces 48*a* to 48*d* so as to be variously oriented along the direction of the arrow W. Accordingly, in the event that bending moment, as moment of rotation mentioned above, is generated, the slider 32 is prevented from being displaced in the rotation direction.

Similar to the first cam followers 50*a* to 50*h*, the second cam followers 51*a* to 51*h* are also in line contact with the output arm guide 49. Accordingly, the similar effect as mentioned above is exerted in the portions of the second cam followers 51*a* to 51*h*.

It should be noted that, in a technique, a mechanism for driving a slider may be configured by mounting a motor and a pulley to a base, the pulley being rotated by the motor, connecting both ends of a single belt to the slider at two positions, and mounting the belt around the base-side pulley. With this configuration, the pulley is rotated by the motor to pull the belt in a predetermined direction to thereby move the slider by the base-side pulley. However, this technique is only based on a concept of mounting a motor to a fixed member, and thus the slider is merely configured to be moved by the pulley provided to the base. In this regard, the present invention is characterized in that a slider includes a motor and a rotation transmitting member to rotate a pulley (second pulley) of a movement mechanism installed in the slider, and that, accordingly, an existing movement mechanism can be used as a movement mechanism of the slider. Therefore, the above technique is completely different from the present invention.

Ninth Embodiment

Figure 25:
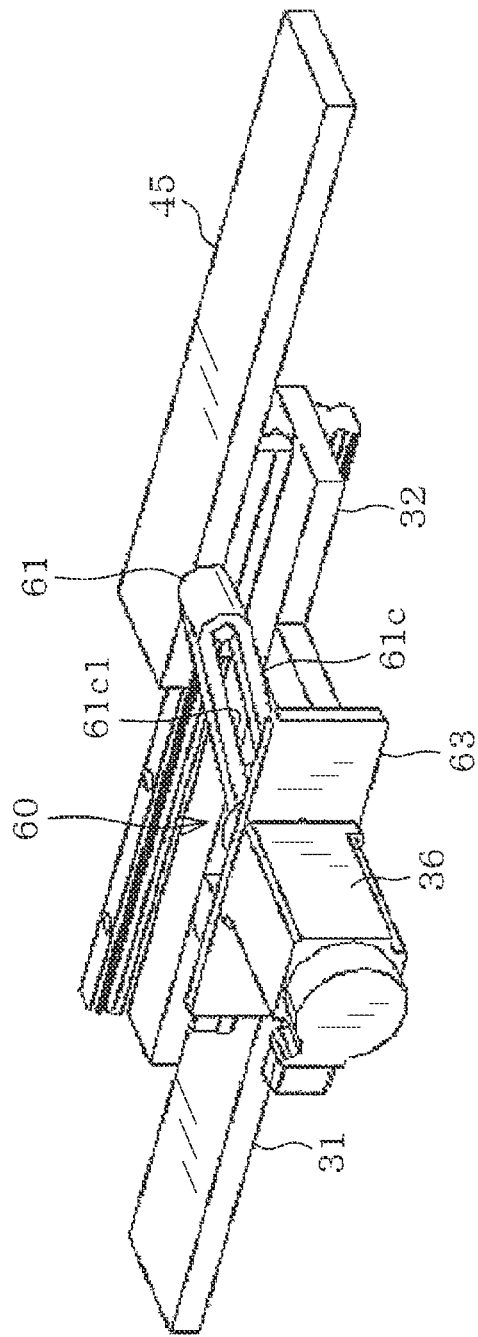
FIG. 25 is a diagram illustrating a horizontal multistage telescopic device according to a ninth embodiment of the invention, the diagram corresponding to FIG. 3.
Figure 26:
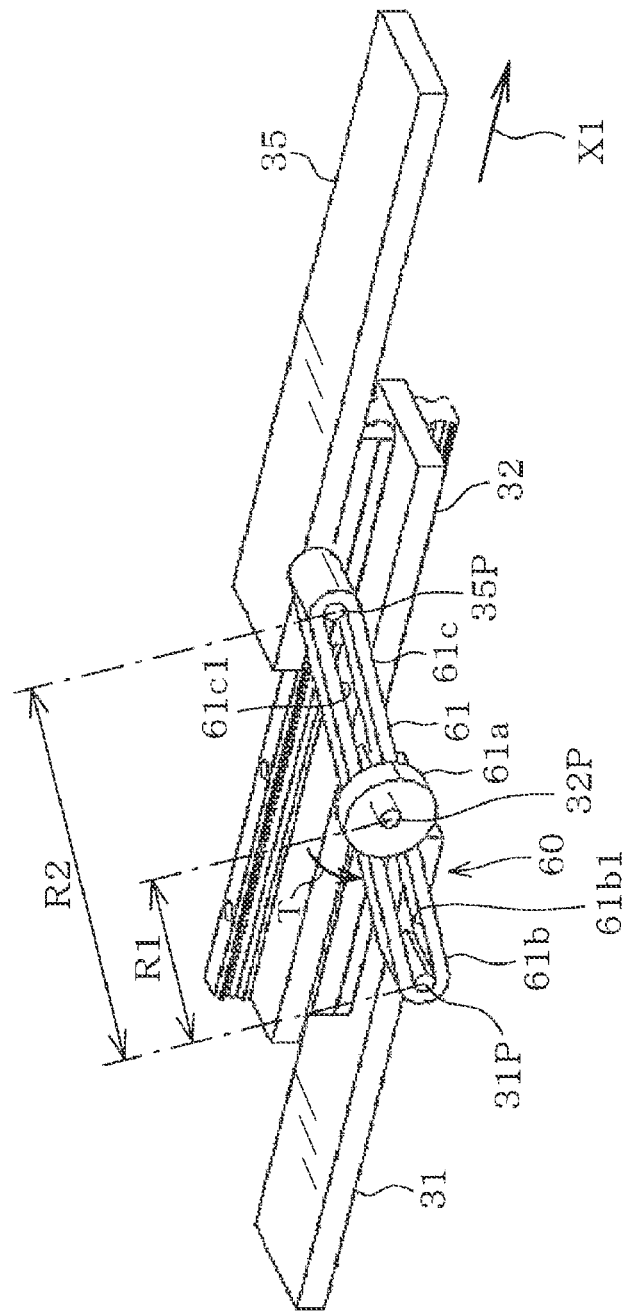
FIG. 26 is a perspective view illustrating the device, omitting a motor, according to the ninth embodiment.

FIGS. 25 and 26 illustrate a telescopic device according to a ninth embodiment of the present invention. The telescopic device of the ninth embodiment includes a movement mechanism 60 which is different from the movement mechanism 34 of the first embodiment. The movement mechanism 60 includes an oscillating arm 61.

The oscillating arm 61 includes an oscillating shaft 61a at an intermediate portion in a longitudinal direction, and first and second guides 61b and 61c oppositely extending from the oscillating shaft 61a. The oscillating shaft 61a of the oscillating arm 61 has a center portion which is rotatably mounted to a spindle 32p projected from a horizontally intermediate portion of the slider 32.

The first and second guides 61b and 61c are each in an arm-like shape and have slits 61b1 and 61c1, respectively. The base 31 is provided with a pin 31p projected therefrom and slidably inserted into the slit 61b1 of the first guide 61b, so that the first guide 61b is slidably connected to the base 31. Further, the output arm 35 is provided with a pin 35p projected therefrom and slidably inserted into the slit 61c1 of the second guide 61c, so that the second guide 61c is slidably connected to the output arm 35.

The slider 32 has a side face to which a motor mounting plate 63 is attached. The motor 36 is mounted to the motor mounting plate 63 so as to be located at a position facing the pivotally-movable shaft 61a. The motor 36 is configured to directly rotate the pivotally-movable shaft 61a of the pivotally-movable arm 61. The rotation direction of the motor 36 can be inverted.

With the pivotally-movable shaft 61a being rotated by the motor 36, the movement mechanism 60 moves the slider 32 relative to the base 31, while moving the output arm 35 by a distance equal to or larger than a stroke of movement of the slider 32. FIG. 26 shows a state where the slider 32 and the output arm 35 have been maximally moved in the direction of the arrow X1. When the pivotally-movable shaft 61a is rotated in a direction of an arrow T from this state, the guides 61b and 61c are unidirectionally rotated to move the slider 32 and the output arm 35 in a direction opposite to the direction of the arrow X1, relative to the pin 31p in a fixed state, for return to the home positions.

In the ninth embodiment, the movement mechanism 60 is configured as described above to exert the following advantageous effects.

A horizontal multistage telescopic device, in general, is configured by movably mounting a slider to a base and movably mounting an output arm to the slider. Such a telescopic device further includes a movement mechanism that interlocks the movement of the output arm with the movement of the slider and moves the output arm by a distance equal to or larger than the stroke of movement of the slider. The telescopic device also includes a motor that is used to move the slider or the output arm for the actuation of the movement mechanism.

The movement mechanism mentioned above includes first and second rotors provided to both ends of the slider in a moving direction thereof, and a linear member mounted across the rotors. A part of the linear member is connected to the base and another part extremely opposite to the firstly mentioned part is connected to the output arm. Long-term use of the telescopic device with such a configuration may cause looseness in the linear member. The ratio of the stroke of movement of the output arm relative to the slider is determined on the basis of a positional relationship between the connecting positions in the belt for the base and for the output arm. However, difficult may be involved in determining a correlation between the positional relationship and the ratio of the stroke of movement.

In this regard, in the ninth embodiment, the movement mechanism 60 is configured to use the pivotally-movable arm 61. Accordingly, unlike the configuration of using a linear member, no problem of looseness arises in the ninth embodiment and thus stable operation is ensured over a long period of time. Further, as shown in FIG. 26, the ratio of the stroke of movement of the output arm 35 relative to the slider 32 (maximum stroke ratio) is expressed by a distance R1 from the pin 31p of the base 31 to the spindle 32p as a center of rotation, and a distance R2 from the pin 31p of the base 31 to the pin 35p of the output arm 35. Accordingly, the ratio of the stroke of movement of the output arm 35 relative to the slider 32 can be easily determined.

Tenth Embodiment

Figure 27:
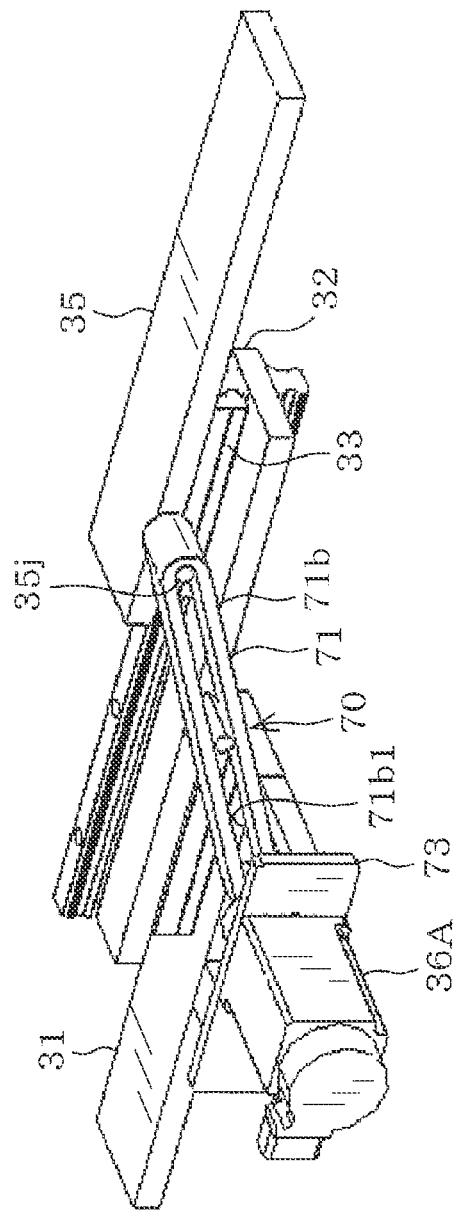
FIG. 27 is a diagram illustrating a horizontal multistage telescopic device according to a tenth embodiment of the invention, the diagram corresponding to FIG. 3.
Figure 28:
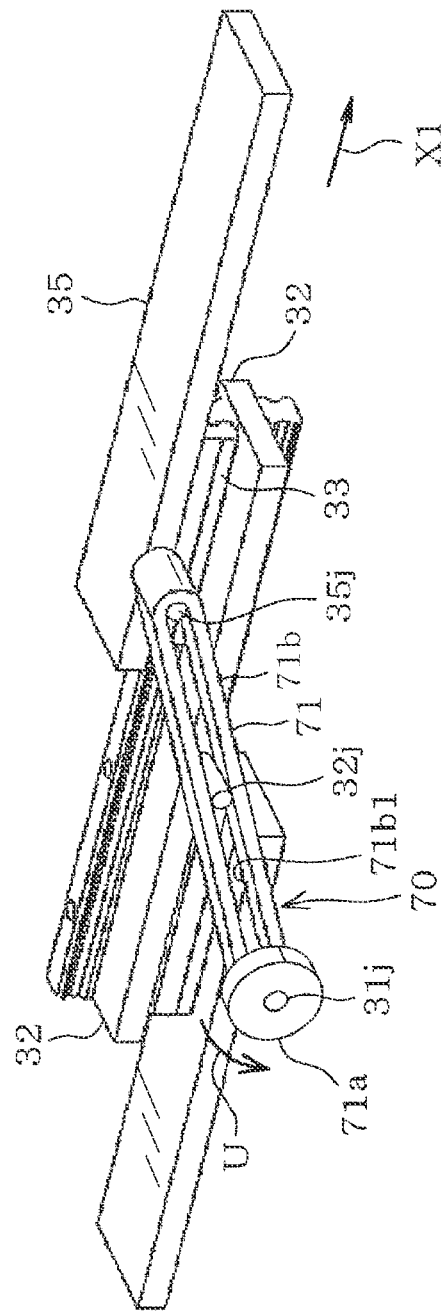
FIG. 28 is a perspective view illustrating the device, omitting a motor, according to the tenth embodiment.

FIGS. 27 and 28 illustrate a telescopic device according to a tenth embodiment of the present invention. The telescopic device of the tenth embodiment includes a movement mechanism 70 different from the movement mechanism of the ninth embodiment. The movement mechanism 70 includes a pivotally-movable arm 71. The pivotally-movable arm 71 includes a pivotally-movable shaft 71a at an end (end of the base 31) in a longitudinal direction, and a guide 71b that extends in one direction from the pivotally-movable shaft 71a. The pivotally-movable shaft 71a of the pivotally-movable arm 71 has a center portion which is rotatably mounted to a spindle 31j projected from the base 31. The guide 71b is in an arm-like shape and has a slit 71b1.

The slider 32 has an intermediate portion from which a pin 32j is projected, while the output arm 35 is provided with a pin 35j projected therefrom. These pins 32j and 35j are slidably inserted into the slit 71b1 of the guide 71b. In other words, the intermediate portion of the slider 32 and the output arm 35 are slidably connected to the guide 71b.

The telescopic device includes a motor 36A mounted to a motor mounting plate 73, which is attached to a side face of the base 31, so as to be located at a position facing the pivotally-movable shaft 71a. The motor 36A is configured to directly rotate the pivotally-movable shaft 71a of the pivotally-movable arm 71.

With the pivotally-movable shaft 71a being rotated by the motor 36A, the movement mechanism 70 moves the slider 32 relative to the base 31, while moving the output arm 35 by a distance equal to or larger than the stroke of movement of the slider 32. FIG. 28 shows a state where the slider 32 and the output arm 35 have been maximally moved in the direction of the arrow X1. When the pivotally-movable shaft 71a is rotated in a direction of an arrow U from this state, the guide 71b is rotated in the same direction to move the slider 32 and the output arm 35 in a direction opposite to the direction of the arrow X1 for return to the home positions.

In the tenth embodiment as well, the advantageous effects similar to those of the ninth embodiment can be enjoyed. In the tenth embodiment, the motor 36A is advantageously provided to the base 31 so as not to impose a load on the movement mechanism 70.

Figure 29:
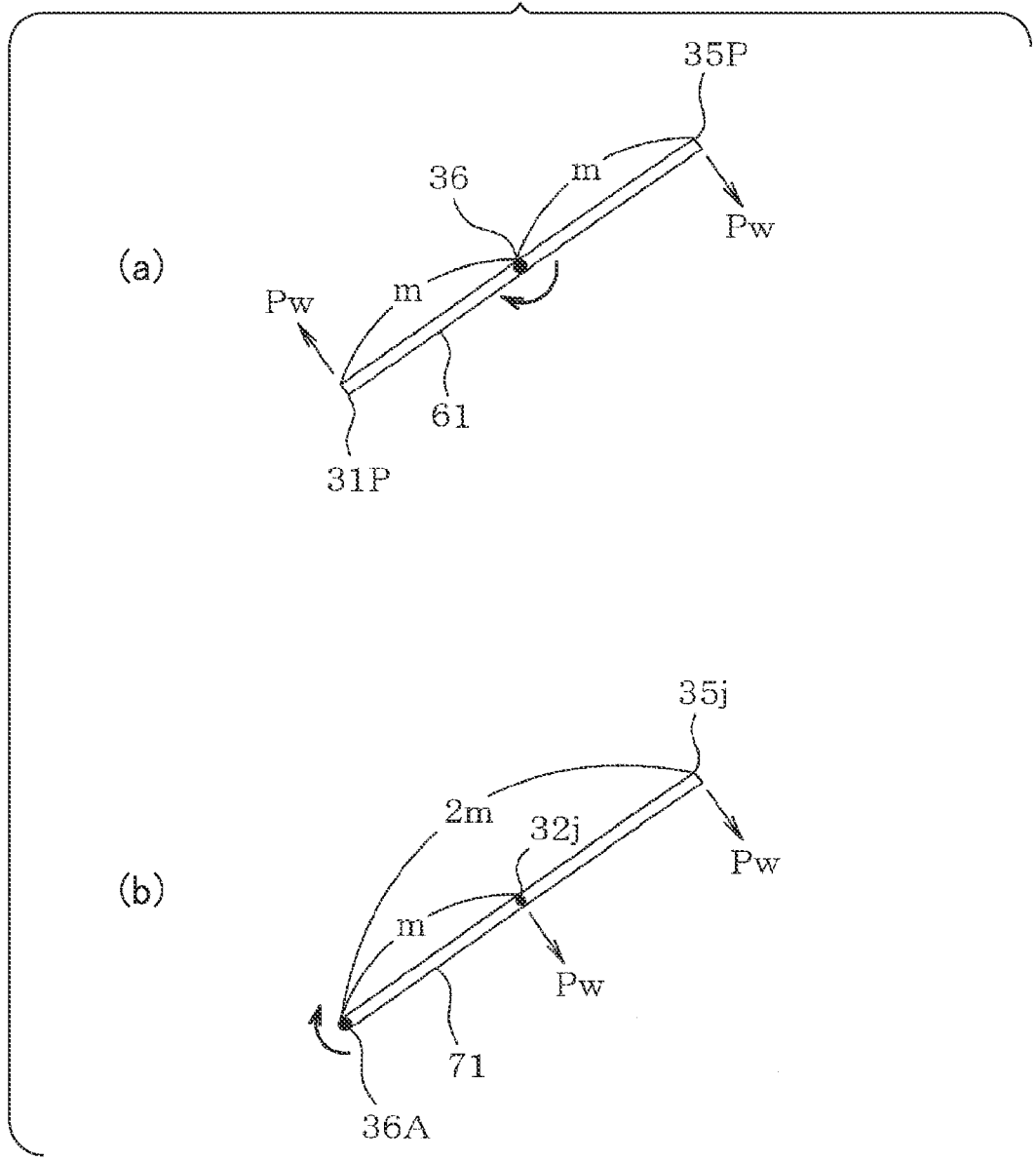
FIG. 29 shows diagrams illustrating references as examples.

Comparing the ninth and tenth embodiments, the ninth embodiment is advantageous in that, as described below, the output torque of the motor 36 can be made smaller than the output torque of the motor 36A of the tenth embodiment. A part (a) of FIG. 29 illustrates the case where the pivotally-movable arm 61 is rotated by the motor 36 of the ninth embodiment. A part (b) of FIG. 29 illustrates the case where the pivotally-movable arm 71 is rotated by the motor 36A of the tenth embodiment. In the case of the part (a) of FIG. 29, when a force Pw is permitted to work on points 31P and 35P in the pivotally-movable arm 61, the motor 36 needs torque as expressed by:

$$m \times Pw + m \times Pw = 2 \times (m \times Pw)$$

In the case of the part (b) of FIG. 29, the motor 36A needs torque as expressed by:

$$m \times Pw + 2m \times Pw = 3 \times (m \times Pw)$$

As will be understood from the above, the telescopic device of the ninth embodiment can reduce the output torque of the motor 36 compared to the tenth embodiment.

The embodiments set forth above are only examples and should not be construed as limiting the scope of the invention. These embodiments may be implemented in various other modes with omissions, replacements or modifications within a scope not departing from the spirit of the invention. These embodiments and their modifications should be construed as being encompassed by the scope or spirit of the invention and as being encompassed by the invention recited in the claims and the equivalent scope.

What is claimed is:

1. An industrial robot comprising a horizontal multistage telescopic device, the horizontal multistage telescopic device including:
    a base including a slider support, the slider support including a slider receiver;
    a slider including a slider guide disposed below the slider, the slider guide being provided along a longitudinal direction of the slider, the slider guide being movably supported by the slider receiver to movably mount the slider to the base, the slider having a width dimension in a horizontal direction set to be larger than a width dimension of the base, the slider being mounted to the base so as to be movable in a first direction and in a second direction that are opposite to each other along the horizontal direction, the slider having a movement limitation position as a home position in the second direction, the slider being disposed above the base;
    an output arm having an end in the second direction, the end being provided with an output arm support, the output arm being expanded in the first direction from the output arm support, the output arm support being mounted to the slider so as to be horizontally movable in the first and second directions, the output arm having an end in the first direction to which an end effector, such as a hand, is mounted, the output arm being provided above the slider;
    a movement mechanism including a first rotor and a second rotor mounted to the ends in the first and second directions, respectively, of the slider, and a linear member mounted across the first and second rotors, the linear member having a first part connected to the base and a second part connected to the output arm support, the second part being opposite to the first part in order to move the output arm in the first direction with the movement of the slider by a distance corresponding to at least a stroke of movement of the slider;
    a motor mounted to an end of the slider in the second direction, the motor being provided spaced apart upward from an upper surface of the slider so as not to interfere with a movement region of the output arm; and
    a rotation transmitting member for transmitting torque of the motor to the second rotor of the movement mechanism, the rotation transmitting member being configured by a rotation transmission mechanism including a driving rotor mounted to a rotary shaft of the motor, a driven rotor provided so as to coaxially and integrally rotate with the second rotor, and a transmission linear member mounted across the driving rotor and the driven rotor.

2. The industrial robot according to claim 1 wherein:
    the slider is provided above the base;
    the rotation transmitting member includes a direction change rotor rotatably mounted proximate to the second rotor to change a moving direction of the linear member; and
    the movement mechanism is configured such that the linear member is mounted across the driving rotor and the direction change rotor, as well as across the first rotor and the second rotor.

3. The industrial robot according to claim 2, wherein:
    the output arm support includes an output arm receiver;
    the slider includes an output arm guide that is provided along a longitudinal direction of the slider; and
    the output receiver is movably brought into contact with the output arm guide to movably mount the output arm to the slider.

4. The industrial robot according to claim 2, wherein the first rotor, the second rotor, the driving rotor and the direction change rotor are each configured by a flat pulley, and the linear member is configured by a flat belt.

5. The industrial robot according to claim 1, wherein the output arm support includes an output arm receiver; the slider includes an output arm guide that is provided along a longitudinal direction of the slider; and the output receiver is movably brought into contact with the output arm guide to movably mount the output arm to the slider.

6. The industrial robot according to claim 5, wherein:
    the slider guide and the output arm guide each includes a first flat surface, a second flat surface, a third flat surface, and a fourth flat surface, each extending in the longitudinal direction with corresponding adjacent surfaces forming substantially a right angle between each of the first flat surface, the second flat surface, the third flat surface, and the fourth flat surface, and each corresponding adjacent surface;
    the slider receiver is configured by a first set of first cam followers and a second set of cam followers, the first set including four first cam followers that are mounted to an end of the slider support of the base so as to be in contact with the respective surfaces of the slider guide, the second set including four first cam followers that are mounted to the other end of the slider support of the base so as to be in contact with the respective surfaces of the slider guide; and
    the output arm receiver is configured by a first set of second cam followers and a second set of second cam followers, the first set including four second cam followers that are mounted to an end of the output arm support so as to be in contact with the respective surfaces of the output arm guide, the second set including four second cam followers that are mounted to the other end of the output arm support so as to be in contact with the respective surfaces of the output arm guide.

7. The industrial robot according to claim 1, wherein:
    the slider is provided above the base;
    the motor is provided on a side face of the slider so as not to interfere with movement regions of the output arm support and the output arm; and
    the rotation transmitting member is configured to directly rotate the second rotor by the motor.

8. The industrial robot according to claim 7, wherein:
    the output arm support includes an output arm receiver;
    the slider includes an output arm guide that is provided along a longitudinal direction of the slider; and the output receiver is movably brought into contact with the output arm guide to movably mount the output arm to the slider.

9. The industrial robot according to claim 1, wherein the rotation transmission mechanism includes the driving rotor and the driven rotor each configured by a sprocket, and the transmission linear member configured by a chain.

10. The industrial robot according to claim 1, wherein:
the first rotor and the second rotor are each configured by a pulley having an outer periphery that is provided with concavo/convex engagement portions at a predetermined pitch; and
the linear member is configured by a belt having an inner surface that is provided with concavo/convex engagement portions at the same predetermined pitch.

11. The industrial robot according to claim 1, wherein the movement mechanism includes V pulleys as the first rotor and the second rotor, respectively, and a V belt as the linear member.

12. The industrial robot according to claim 1, wherein the movement mechanism includes sprockets as the first rotor and the second rotor, respectively, and a chain as the linear member.

13. The industrial robot according to claim 1, wherein:
the driving rotor and the driven rotor of the rotation transmission mechanism are each configured by a pulley having an outer periphery that is provided with concavo/convex engagement portions at a predetermined pitch; and
the linear member is configured by a belt having an inner periphery that is provided with concavo/convex engagement portions at a predetermined pitch.

14. The industrial robot according to claim 1, wherein the rotation transmission mechanism includes the driving rotor and the driven rotor each being configured by a V pulley, and the transmission linear member configured by a V belt.

* * * * *